United States Patent
Feltin et al.

(10) Patent No.: US 7,321,928 B2
(45) Date of Patent: Jan. 22, 2008

(54) SUPER PEERING ARCHITECTURE

(75) Inventors: Eric Feltin, London (GB); Chris Nelson, London (GB); Simon Blackburn, London (GB)

(73) Assignee: Switchfire Limited, London (GB)

( * ) Notice: Subject to any disclaimer, the term of this patent is extended or adjusted under 35 U.S.C. 154(b) by 664 days.

(21) Appl. No.: 09/989,718

(22) Filed: Nov. 21, 2001

(65) Prior Publication Data
US 2003/0126245 A1 Jul. 3, 2003

(30) Foreign Application Priority Data
Nov. 22, 2000 (GB) .................................. 0028474.5

(51) Int. Cl.
 G06F 15/16 (2006.01)
 G06F 17/60 (2006.01)
(52) U.S. Cl. .................... 709/223; 709/204; 709/206; 709/227; 709/228; 709/229; 709/246; 709/248; 705/37; 705/26
(58) Field of Classification Search ................ 709/204, 709/206, 208–209, 227–229, 246, 248, 223; 705/37, 26
 See application file for complete search history.

(56) References Cited

U.S. PATENT DOCUMENTS

| 5,550,980 | A | * | 8/1996 | Pascucci et al. ............. 250/551 |
| 5,774,873 | A | * | 6/1998 | Berent et al. ................. 705/26 |
| 5,835,726 | A | * | 11/1998 | Shwed et al. ................ 709/229 |
| 6,012,045 | A | * | 1/2000 | Barzilai et al. ............... 705/37 |
| 6,212,633 | B1 | * | 4/2001 | Levy et al. .................. 713/153 |
| 6,487,600 | B1 | * | 11/2002 | Lynch ........................ 709/229 |
| 6,564,192 | B1 | * | 5/2003 | Kinney et al. ................. 705/37 |
| 6,640,241 | B1 | * | 10/2003 | Ozzie et al. ................. 709/204 |
| 6,751,666 | B1 | * | 6/2004 | Huang et al. ................ 709/226 |
| 6,763,372 | B1 | * | 7/2004 | Dani et al. ................... 709/204 |
| 6,779,017 | B1 | * | 8/2004 | Lamberton et al. .......... 709/203 |
| 6,785,706 | B1 | * | 8/2004 | Horman ....................... 706/203 |
| 6,978,294 | B1 | * | 12/2005 | Adams et al. ............... 709/217 |
| 6,988,085 | B2 | * | 1/2006 | Hedy ........................... 705/51 |
| 7,133,846 | B1 | * | 11/2006 | Ginter et al. ................. 705/54 |
| 2002/0095368 | A1 | * | 7/2002 | Tran ............................ 705/37 |
| 2002/0107786 | A1 | * | 8/2002 | Lehmann-Haupt et al. ... 705/37 |
| 2002/0138399 | A1 | * | 9/2002 | Hayes et al. .................. 705/37 |
| 2003/0018566 | A1 | * | 1/2003 | Mackay et al. ............... 705/37 |

FOREIGN PATENT DOCUMENTS

| EP | 0987644 A2 | * | 8/1999 |
| GB | 2294788 | * | 8/1995 |
| GB | 25570.3 | * | 10/2000 |

OTHER PUBLICATIONS

Borland, John, "Democracy's traffic jams", Oct. 26, 2000, http://news.cnet.com/news/0-1005-201-3248711-2.html, 3 pages.

* cited by examiner

*Primary Examiner*—David Wiley
*Assistant Examiner*—Alina Boutah
(74) *Attorney, Agent, or Firm*—Sterne, Kessler, Goldstein & Fox P.L.L.C.

(57) ABSTRACT

A method of operating a computing device wherein said device is adapted to perform a supervisory and/or supporting role in relation to peers in a peer-to-peer network, the method including the steps of:
 a. the computing device establishing contact with a plurality of peers which are to be the subject of the supervision and/or support role; and
 b. providing said supervision and/or support.

1 Claim, 12 Drawing Sheets

Figure 3

I HAVE:

| TITLE | ISSUE | CONDITION | BOOK VALUE | STATUS | GENERAL INTEREST |
|---|---|---|---|---|---|
| ☐ Iron Man | 1 | Mint | £1200 | Hidden | 25 people (£450-1500) |
| ☐ Iron Man | 2 | Good | £150 | Showing | 5 people (£52-97) |
| ☑ Iron Man | 3 | Poor | £12 | Showing | 1 person (£5) |
| ☐ Iron Man | 5 | VGood ✓ | £250 | Open Auction | 6 bidders out of 10 (last £212)(47 hrs left) |
| ☐ Iron Man | 7 | VGood ✓ | £240 | Closed Auction | 5 bids rec'd out of 12 (41 hrs left) |
| ☐ Iron Man | 9 | NrMint ✓ | £570 | Selling for £600 | 2 people (£550-570) |
| ☐ Iron Man | 9 | Okay | £85 | Sold | Sold to Timelord on 12/10/00 |

✓ = condition verified by Rækanet. Item in Rækanet's possession.
♣ = click here to minimise this section

[Add Another]  Tick (☑) one (or more) and: [Delete it] [Change it] [Make An Offer]

I WANT:

| TITLE | ISSUE | CONDITION | BOOK VALUE | GENERAL AVAILABILITY | OFFERING |
|---|---|---|---|---|---|
| ☐ Iron Man | 4 | VGood - | £275 - | 10 people (£270-300) | You're offering £60 |
| ☐ Iron Man | 6 | Okay + | £90 + | 6 people (no prices) | You've bid £85 to Timelord * highest bid * |
| ☐ Iron Man | 6 | Okay + | £90 + | 6 people (no prices) | You've bid £60 to Snoopy |
| ☐ Iron Man | 20 | Okay | £40 | 34 people (£41-49) | You've made no offers |

♣ = click here to minimise this section

[Add Another]  Tick (☑) one (or more) and: [Delete it] [Change it] [Make an Offer]

WHO'S ONLINE:

| USER | LOCATION | SIZE OF COLLECTION | ROOMS |
|---|---|---|---|
| ☑ B2137 | New York, NY, USA | 21 titles | Iron Man, Black Avenger, The Vigilante, ... |
| ☑ James40 | Boston, MA, USA | <not listed> | Iron Man, Spiderman |
| ☑ TimeLord | London, UK | 257 titles | Iron Man, Justice League, Superman, ... |
| ☑ AC573 | Johannesburg, SA | 3150 titles | Spiderman, Cat Women, Batman, ... |
| ☑ Chuck17 | <not listed> | 128 titles | Spiderman |

☑ = open private chat window with this user
⚘ = a registered friend. Click on this icon (or the gap) to register/deregister friends.
♣ = click here to minimise this section

[Enter a Chat Room] [Change Who's Listed Above]

MESSAGES:

PRIVATE MESSAGES:
✉ 23/Oct/2000 19:09 GMT  TimeLord  acknowledges receiving your bid of £85 for his 'okay' condition Iron Man 6 comic. You are reminded that this auction closes on 31/10/2000 at 13:46 GMT.

NOTICE BOARDS:
| | | |
|---|---|---|
| ☑ 🗑 Should Marvel Comics Merge? | 79 postings | Last Posting: 23/Oct/2000 18:09 GMT |
| ☑ 🗑 Is Robin Gay? | 13 postings | Last Posting: 22/Oct/2000 04:45 GMT |
| ☑ 🗑 Iron Man vs Magneto Boy. Who would win? | 341 postings | Last Posting: 23/Oct/2000 19:06 GMT |

☑ = open notice board   🗑 = delete message / remove notice board
♣ = click here to minimise this section

[List More Boards] [Create New Board]

Figure 4a

Figure 4b: If Clicked on "I Have" General Interest for Iron Man 2

| | | | | | TITLE | ISSUE | STATUS | | |
|---|---|---|---|---|---|---|---|---|---|
| | | | | | Iron Man | 2 | Showing ▼ | | |
| | | | CONDITION | OFFERING | USER | STATUS | LOCATION | | EMAIL |
| | ✉ | $ | Good | £97 | Susan437 | offline | <not listed> | | <not listed> |
| ✎ | ✉ | $ | Good + | Dutch Auction(last £92) | TimeLord | ONLINE | London, UK | | TimeLord@yahoo.com |
| | ✉ | $ | Good + | £64 | Vesperan | offline | <not listed> | | Vesperan@ATT.COM |
| ✎ | | $ | Okay + | £52 | BZ137 | ONLINE | New York, NY, USA | | <not listed> |
| | ✉ | $ | Good - | No specific offer | XCharles | offline | Manchester, UK | | CThomas@hotmail.com |

✎ = open private chat window with this user   ✉ = send an email to this user   $ = make an offer to this user Figure 4c: If Clicked on "I Want" General Availability for Iron Man 4

| | | | | YOUR OFFERS | TITLE | ISSUE | CONDITION | |
|---|---|---|---|---|---|---|---|---|
| | | | | £60 public offer | Iron Man | 4 | VGood - ▼ | |
| | | | | no private offers | | | | |
| | | | CONDITION | OFFERING | USER | STATUS | LOCATION | EMAIL |
| ✎ | ✉ | $ | Okay | Asking £55 | James40 | ONLINE | <not listed> | <not listed> |
| ✎ | | $ | Good ✓ | Open Auction (last £74)(2 dys left) | BZ137 | ONLINE | New York, NY, USA | <not listed> |
| ✎ | ✉ | $ | Good ✓ | Asking £80 | AC573 | ONLINE | Johannesburg, SA | ac573@... |
| | ✉ | $ | VGood | Closed Bids (4dys left)(you have no bid) | Vesperan | offline | <not listed> | Vesperan@ATT.COM |

✎ = open private chat window with this user   ✉ = send an email to this user   $ = make an offer to this user Figure 4d: If Clicked on a Username on any Page

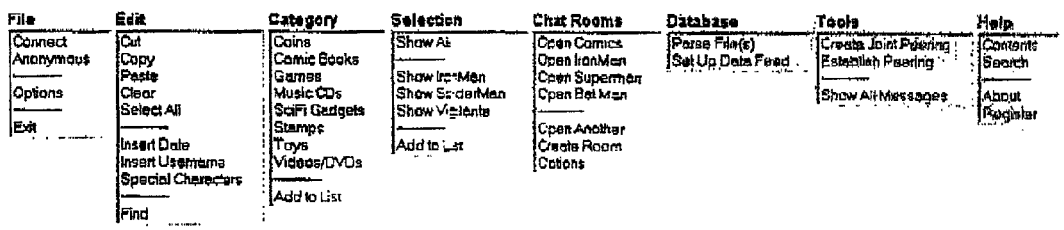

| USER | LOCATION | SIZE OF COLLECTION |
|---|---|---|
| TimeLord | London, UK | 257 titles |
| STATUS | EMAIL | CHAT ROOM MEMBERSHIPS |
| ✓ ONLINE | ✉ TimeLord@yahoo.com | Iron Man |

COMMENTS:
I have over 200 Iron Man comics. Many in Near Mint condition. See my webpage ( http://www.geocities.com/TimeLord ) to get more details.

✓ = open private chat window with this user  ✉ = send an email to this user  $ = make an offer to this user Figure 4e: Main Menu Bar

| File | Edit | Category | Selection | Chat Rooms | Database | Tools | Help |
|---|---|---|---|---|---|---|---|
| Connect | Cut | Coins | Show All | Open Comics | Parse File(s) | Create Joint Peering | Contents |
| Anonymous | Copy | Comic Books | | Open IronMan | Set Up Data Feed | Establish Peering | Search |
| | Paste | Games | Show IronMan | Open Superman | | | |
| Options | Clear | Music CDs | Show SpiderMan | Open BatMan | | Show All Messages | About |
| | Select All | SciFi Gadgets | Show Villains | | | | Register |
| Exit | | Stamps | | Open Another | | | |
| | Insert Date | Toys | Add to List | Create Room | | | |
| | Insert Username | Videos/DVDs | | Options | | | |
| | Special Characters | | | | | | |
| | | Add to List | | | | | |
| | Find | | | | | | |

FIGURE 5A: FULL DETAILS
| Title / No. | Condition | Comments |
|---|---|---|
| Ironman 11 | Mint | Miscellanous facts |
| Ironman 203 | Good | Other details |
| Ironman 204 | Poor | |
| Spiderman 5 | V Good | Even more items of interest |
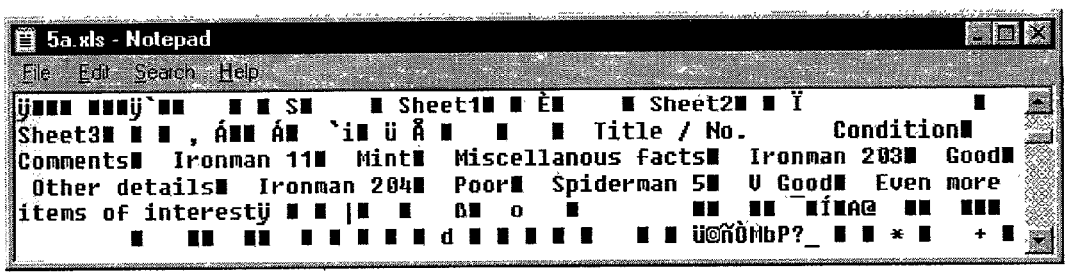
*Above Table in Microsoft Excel Format*
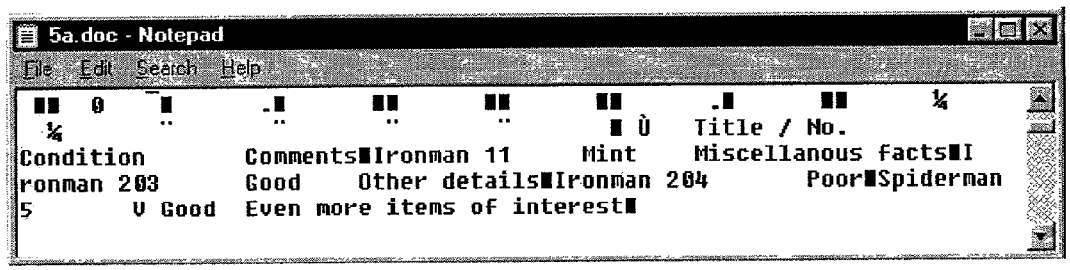
*Above Table in Microsoft Word Format*
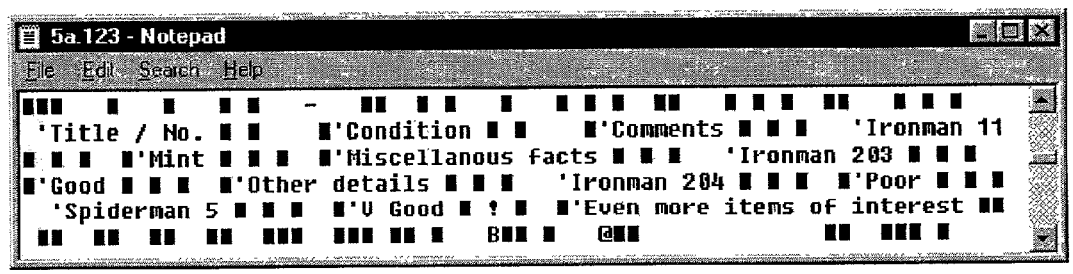
*Above Table in Lotus 123 Format*
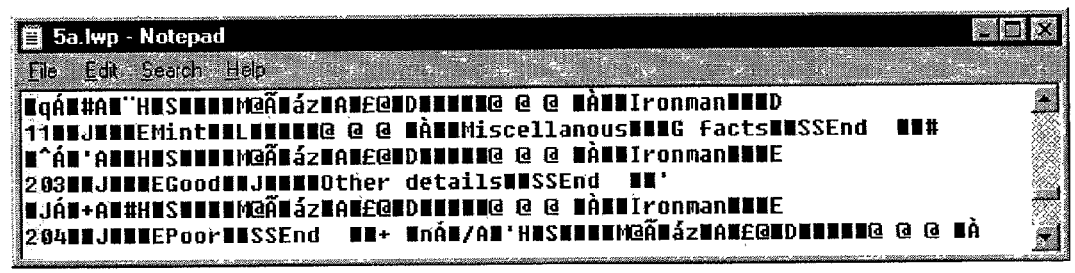
*Above Table in Lotus Word Pro Format*

FIGURE 5B: SUMMARISED

Title / No.   Condition   Comments
Ironman
    11   Mint   Miscellanous facts
    203   Good   Other details
    204   Poor
Spiderman
    5   V Good   Even more items of interest

*Above Table in Microsoft Excel Format*

*Above Table in Microsoft Word Format*

*Above Table in Lotus 123 Format*

*Above Table in Lotus Word Pro Format*

SUPER PEERING ARCHITECTURE

BACKGROUND OF THE INVENTION

1. Field of the Invention

This invention relates generally to the remote matching of buyers and sellers of products and services (hereafter simply called products) and to the management of remote transactions and exchanges of information between pairs and groups of buyers and sellers. More particularly, although not exclusively, the invention relates to a new type of network architecture and to an implementation of this new network architecture to create an electronic marketplace for physical and virtual goods.

2. Related Art

Currently, purchases transacted remotely (for example, over the Internet via the World Wide Web) conform to the general client/server model. Namely, potential suppliers establish servers that make available databases of products and prices, and functionality to effect the sale of such products. Potential buyers then search for the servers of suppliers potentially with the relevant products. Acting as clients to each of these servers (see FIG. 1), the potential buyers then searches the pre-existing databases of products for the specific product that meets their needs. Once found and flagged, the server then effects the sale—establishing the identity of the buyer and his/her delivery and other preference, and taking billing details as required.

Although this approach works well with products that are easily specified by the potential buyer (for example books, compact music diskettes, and new cars) and that have a standard price and that are offered by a small number of suppliers, when it (the general client/server model) is applied to more complex supply and demand situations this approach is deficient in a number of way.

First, often there are multiple suppliers of products that meet the buyer's needs and often these products are available at different prices, are of differing quality, have slightly different characteristics, and/or are sold on different terms. In such situations, the resulting transaction(s) would be more efficient if the buyer were more easily able to compare the various offerings and to negotiate with each potential supplier the price and other terms.

Second, some products are in limited supply, and sometimes demand for such products outstrips supply. In such situations, the resulting transaction(s) would be more efficient if the seller were able to negotiate with all the potential buyers either publicly or in private.

Third, the client/server approach demands that each supplier provide a database of available products on a server. Assembly of these databases must be done speculatively so as to be available when the first potential buyer establishes contact. Assembling and maintaining such databases is expensive and time-consuming. For small suppliers (especially unincorporated individuals) speculatively creating databases of the products potentially available is prohibitively expensive and time-consuming. As a result, the buyer does not have access to all products potentially available and thus the resulting transactions are inefficient.

Fourth, even if a supplier does speculatively create and maintain databases of all products potentially available, the static nature of such databases precludes the dynamic adjustment of price and terms (for example, based on current market conditions). Once again, the result is inefficient transactions for the seller.

Fifth, each supplier must make potential buyers aware of their servers and the nature of the products available from them. For small suppliers (especially unincorporated individuals) creating this awareness (even via the "search engines") is difficult and often ineffective. As a result, the seller is unable to reach all potential buyers and thus the resulting transactions are inefficient.

Sixth, with each supplier operating their own server there is considerable duplication of functionality combined with a disruptive lack of standardisation in this functionality, but more importantly in how the available products are described, organised, and presented to users. As a result, the buyer has a difficult task finding and comparing the available options which in itself is inefficient but also necessarily results in some inefficient transactions.

Seventh, in addition to duplicating functionality, each supplier must independently establish the identity of each buyer and must independently process transactions. Similarly each potential buyer must independently assess the trustworthiness of each potential supplier. Both of which result in considerable, unnecessary transaction costs.

Eighth, client/server approaches rely on the operation of the server. Although this approach makes communication efficient, if the server(s) fail for whatever reason, all transactions of all types are interrupted.

All these deficiencies lead to inefficient transactions which are neither in the best interests of the buyer or the seller.

A number of alternative ways of handling purchases transacted remotely have arisen in recent years to overcome these deficiencies. None of these alternatives, however, adequately address all eight deficiencies, and all of these alternatives bring their own additional deficiencies.

The first alternative follows a client/server notice board model. Similar to the more typical general client/server model, potential buyers act as clients to access pre-existing databases of products on a server. These databases are searched using one of the plurality of methods described above and the server effects the sale, if it is agreed (see FIG. 2).

The notice board model differs from the general client/server model in that products from a wide range of suppliers (including unincorporated individuals) are displayed. As a result, the same item is often available from a range of suppliers often at different prices. Potential buyers are able to determine which specific instance to buy from the price, the unstructured description provided by the supplier, and from the supplier's reputation as summarised by a score provided by those who dealt with the individual previously.

The notice board model attempts to address the first deficiency listed above (i.e. multiple suppliers) by displaying together all variants of a given product from the widest range of suppliers. This model fails to fully address the first deficiency, however, because although comparison of options is possible, direct communication between the buyer and each potential supplier is not supported. Thus, true comparison of the offerings is not possible, the appropriateness of the various suppliers can not be adequately judged, and negotiation to find the optimal price and terms is not possible. The result is inefficient transactions.

The notice board model does not attempt to address the second deficiency (the situation where there are multiple buyers for a product in limited supply) focussing instead on near commodity products (e.g. books, music, movies, and DVDs) in which supply will almost always outstrip demand.

The notice board model fails to address the third deficiency (the burden of assembling and maintaining the product databases). Although the operator of the server is not required to put in the required effort, this burden is transferred to the individual potential suppliers. Since the individual suppliers do not have the same tools nor the economies of scale potentially available to the server operator, the total amount of effort required to assemble and maintain the product database is thus increased. The fact that existing systems are having some success proves that some potential suppliers at least are not find the resulting burden prohibitive. Regardless, the cost of uploading the details of all products potentially available for sale is prohibitive for many potential suppliers and thus the buyer is not presented with the widest range of options and inefficient transactions result.

Similarly, the fourth deficiency is not addressed by the notice board model, rather it is simply side-stepped. The pre-existing database of products still requires manual editing to update prices and terms. Given that the task of maintaining the database is distributed to the individual potential suppliers, the total amount of effort required is increased.

With regard to the fifth, sixth, and seventh deficiencies, the notice board model is a significant improvement. Advertising/awareness building, search and transaction functionality, and security are all centralised—greatly reducing the collective burden and making the process much easier.

The notice board model, being a variant of the client/server model still suffers from the eighth deficiency (i.e. that the marketplace is vulnerable to complete shutdown if the server(s) or network connection(s) to the server(s) should fail).

In addition to the above deficiencies, the notice board model has an additional deficiency (the ninth deficiency of client/server approaches). Having each supplier operate his/her own server (as in the general client/server model) allows each supplier to tailor the presentation of his/her offerings in the manner that best conveys their relevant merits. By focussing on just commodity products and by standardising the way each offering is presented and by precluding direct communication between buyers and suppliers, the notice board model prevents such tailoring and is thus only relevant for very simple transactions.

The second alternative to the general client/server model follows a client-server auction model. Similar to the client/server notice board model, potential suppliers create their own entries in a central database of products. Potential buyers then act as clients to access this databases on a server, searching the databases using one of the plurality of methods described above. The server effects the sale, if it is agreed (see FIG. 3). Whereas the notice board model tends to concentrate on over supply with limited demand; the auction model tends to concentrate on over demand with limited supply.

The auction model has many of the strengths and deficiencies of the notice board model. Advertising/awareness building, search and transaction functionality, and security are all centralised, thus alleviating deficiencies 5, 6, and 7. In parallel, however, the burden of database assembly and maintenance is passed onto the individual suppliers without providing matching tools and thus exacerbating deficiencies 3 and 4.

Whereas the notice board model concentrates on over supply and thus addresses deficiency 1 but ignores deficiency 2. The auction model, on the other hand, concentrates on over demand and thus addresses deficiency 2 while ignoring deficiency 1. Similar to the notice board model, the auction model continues to suffer from the eighth deficiency (i.e. that the marketplace is vulnerable) and also suffers from the new deficiency (i.e. the ninth deficiency) in that suppliers are not able to describe adequately their offerings.

Essentially, both the notice board model and the auction model address some weaknesses of the general client/server model, while exacerbating others by 1) shifting the burden of work onto unskilled suppliers with inappropriate tools, and 2) not facilitating direct communication between the buyers and suppliers.

A third alternative to the general client/server model exists which employs "refinable products" are described in UK Patent Application No. 0009077.9. "Refinable products" can be combined with the general client/server model, the notice board model, and the auction model to increase the level of communication between buyers and suppliers so as to generate more efficient transactions. Although this enhancement goes some way to addressing the many deficiencies listed above, there is still the fundamental deficiency in all client/server applications that the process of creating and maintaining the database is laborious, the marketplace is vulnerable, and inefficient transactions get entered into because detailed negotiations between buyers and suppliers are either not supported or are not easy.

Recently, a fourth alternative has emerged. The peer-to-peer model forsakes client/server relationships and pre-existing database of products in favour of direct interaction between "buyers" and suppliers. Thus far only applied to the electronic sharing of files (in particular music files), the peer-to-peer model has been implemented in two forms.

In its purest form (for example, Gnutella), each potential "buyer" and supplier runs a peer application. The peer application announces its presence over whatever network it is attached to. Other peers receive and acknowledge the announcement and thus "knif" the new peer into a dynamic network of peers currently online. When a particular "buyer" wants a product, he broadcasts his request to the dynamic network of peers. Any peers able to fulfil the request get into direct contact with the requester. The requester then employs standard network protocols to download the relevant file from one of the potential suppliers.

In another form (for example, Napster), a central server is used to optimise performance and to ensure that all peers are able to communicate with all other peers. When a new peer application attaches itself to a network, it announces its presence (and its list of files available for transfer) to the server. When a particular "buyer" wants a product, he sends his request to the server, who replies with a list of all peers with the relevant file. As before, direct communication is then entered into individually between the requester and each potential supplier. Once a suitable partner is selected, the requester employs standard network protocols to download the relevant file from the selected supplier.

The peer-to-peer model overcomes many of the deficiencies of the client/server model. It elegantly handles both the case of over supply (deficiency 1) and of over demand (deficiency 2), yielding the most efficient transaction by allowing every "buyer" to communicate directly with every supplier.

Peer-to-peer handles the problem of database assembly and maintenance (deficiencies 3 and 4) by dynamically creating the database based on the peers currently online (Napster) or by having no database at all and instead simply allowing each supplier to respond to each request as it appears (Gnutella). In both cases software is provided to automatically search the local hard drive for relevant files, thus automatically assembling the supply databases.

Peer-to-peer handles the problem of awareness building/advertising (deficiency 5) by routing requests automatically and thus there is no need for the "buyer" to know the specific peers who might have the desired product.

Although there is duplication of functionality (deficiency 6), this duplication does not give rise to a disruptive lack of standardisation as every peer is using the same software and thus products are categorised and described similarly.

The peer-to-peer model (in its pure form, not the form promulgated by Napster) overcomes the problem of catastrophic failure (deficiency 8) by not having any node in the network any more important than any other node. The peer-to-peer model, however, completely fails to address the issue of security (deficiency 7).

Unfortunately, despite all these improvements. Existing peer-to-peer models have several very significant deficiencies.

First, because peer-to-peer transactions involve any two peers getting into contact with each other, the effort required in each transaction to certify the other peer's identity and to then establish the necessary trust with the other user is greatly increased. At least with the client/server models one of the two parties (i.e. the server) is known (although not necessarily trusted). With peer-to-peer, it is likely that both parties are unknown and could be essentially untraceable.

To date this hurdle has been insurmountable in practical terms and thus no existing peer-to-peer systems work with money (electronic, physical, or otherwise). In addition, no existing peer-to-peer systems work with physical goods. The "buyer" pays nothing for what is supplied.

Second, in a similar vein, because peer-to-peer transactions involve only two parties, no mechanisms exist to exchange funds electronically. Although, in theory cheques could be sent through the post (or goods could be sent in a swap exchange), the inherent problems of trust (see above) have discouraged such practices to the point that it is not done. Again, the result is that no existing peer-to-peer systems work with money (electronic, physical, or otherwise) or with the exchange of goods (electronic, physical, or otherwise).

Third, existing peer-to-peer networks only relate to peers connected to the peering networked at the time and peer-to-peer networks have no memory. Thus, peers not connected are not represented. With pure peer-to-peer networks, the effective size of the network is narrowed further to just those peers who are reached in seven "steps". Given that the receiver of each message can only pass it to seven others, and that the message can only be passed seven times, and that there can be considerable overlap between the "others to forward messages to" list of friends, the effective size of each peer's network can be very small indeed.

As a result, the "buyer" does not have access to all products potentially available and the supplier does not have access to all potential "buyers", and thus if money were being exchanged the resulting transactions would be inefficient.

Fourth, because existing peer-to-peer networks only cater for transactions involving no money and because "buyers" are only able to view the products available from those who are online at the present time, existing peer-to-peer networks have been forced to concentrate solely on electronic exchanges (e.g. music files). The result is that no existing peer-to-peer systems work with physical products. If it can not be transferred electronically, then it is ignored.

Fifth, by definition peer-to-peer exchanges involve just two peers. Although this facilitates individual negotiation, it precludes auctions and other group negotiation mechanisms. This preclusion arises not only from the definition of peer-to-peer (i.e. that it involves only two peers), but also from the fact that there is no mechanism for any other peer (or server or any other third-party) to manage an auction, for example. The result is a radically curtailed set of negotiations. Given the existing concentration on free electronic transfers, this limitation is not a problem. However, if money were being exchanged, this limitation would be very significant.

Sixth, also by definition peer-to-peer exchanges involve two peers of equivalent capability and responsibility. No existing peer-to-peer networks cater for mobile phones, palm tops, or other "weak" peers. Similarly, no existing peer-to-peer networks take advantage of the unique capabilities of particularly powerful PCs (or other "strong" peers).

Seventh, to date no one has found a way of making money from operating a peer-to-peer network. Without a reward for the host of such a network, their development will remain limited and non-peer-to-peer alternatives will always be touted as superior.

Eight, because there are no central services in true peer-to-peer networks, the same message must be passed numerous times around the network to ensure that each peer of potential relevance receives a copy. Such an approach generates considerable bandwidth, which can makes peer-to-peer networks slow and expensive to operate.

SUMMARY OF THE INVENTION

The current invention solves these deficiencies in one aspect by creating a new type of network architecture—hereafter referred to as "co-operative peering". In one aspect of the invention, an embodiment is created for handling the remote purchase and sale of products and services utilising many "co-operative peering" principles.

Other aspects are as described below or claimed hereafter.

The co-operative peering network architecture is distinct from existing architectures in a number of ways.

First, by general convention (see sample definitions attached in FIG. 6) there are only two types of network architecture in common usage: client/server and peer-to-peer. For client/server networks, each computer or process is either a client OR a server; and whichever it is, it remains that. For peer-to-peer networks each computer has equivalent capabilities and responsibilities. In co-operative peering networks the allocation of responsibilities is more complex. In extreme cases, particularly capable peers may appear to act as servers for particularly weak peers (e.g. mobile phones). At the other extreme, two peers of similar capability may appear to interact in a traditional peer-to-peer manner. In the vast majority of cases, however, tasks will be divided between peers in a dynamic fashion depending on the capabilities of each at the time. A particular service may be provided by one peer at one time, and by another later—all depending on relative capabilities.

Second, by general convention, network architectures are defined in terms of how any two computers or processes interact. For certain processes, however, a third peer may be required to "witness" or "arbitrate" a transaction. This type of behaviour (hereafter referred to as "tri-peering") can not be meaningfully described using either the client/server or the peer-to-peer models.

Third, for reasons of security certain processes may be run in parallel on a number of peers so that conflicting results becomes evidence of tampering. This type of behaviour (hereafter referred to as "jury peering") can not be meaningfully described using either the client/server or the peer-to-peer models.

Fourth, also for reasons of security certain processes may be broken into discrete steps where each step is performed by a different set of jury peers with the results to be sent for further processing to a new jury, whose members are selected at random. This type of behaviour (hereafter referred to as "random access peering") can not be meaningfully described using either the client/server or the peer-to-peer models.

Fifth, in the near future it is likely that individual users will be actively connected to Internet via multiple devices (e.g. their office PC, their home PC, their Web TV, and their mobile phone). The same is likely to happen with users of other networks. In these cases, two or more peers may act in unison where the instructions of either are intended to affect both. This type of behaviour (hereafter referred to as "joint peering") can not be meaningfully described using either the client/server or the peer-to-peer models.

Sixth, at any given time a particular device may be acting as a jury member for one transaction, an independent guide facilitating a random access peering transition for another transaction, a witness for a third transaction, and a joint peer in a fourth transaction—the only transaction of the four actually related to the interests of the device's owner. In this case, the device's resources may be strained and thus it might be more efficient to shift to another peer part of its burden. Such "dynamic unequal peering" is totally beyond the conception of either the client/server of the peer-to-peer network architecture models.

Seventh, although client/server behaviour can be modelled in co-operative peering terms and although peer-to-peer behaviour can be modelled in co-operative peering terms, as can be seen above neither the client/server network architecture model nor the peer-to-peer network architecture model can meaningfully model the behaviour of a co-operative peering network.

The present embodiment is distinct from existing methods and systems for handling the remote purchase and sale of products and services in a number of ways.

First, the present embodiment employs certain co-operative peering principles. Thus, unlike client/server solutions, the user runs a special application on his/her PC (or other device). This special application has certain responsibility that a normal client/server client could not have.

Distinctive responsibilities of the present embodiment include processing various files on the device so as to generate a dynamic database of products potentially available for sale. This distinction is fundamental to overcoming the third deficiency of client/server approaches.

The fact that virtually identical code generates these dynamic database and displays the results is fundamental to overcoming the sixth deficiency of client/server approaches.

The fact that the resulting dynamic databases are shared with all other peers (and/or is compared to current demand—see below) is fundamental to overcoming the first, second, and fifth deficiencies of client/server approaches.

Second, unlike client/server solutions, the special application run by users has certain abilities that a normal client/server client does not have.

Distinctive abilities of the present embodiment include the ability to contact other instances of the present embodiment (hereafter referred to as "peers") running on other users' PCs (or other devices) without reference to a server. This distinction is also fundamental to overcoming the first and second deficiencies of client/server approaches.

The immediate feedback to the user on current supply and demand generated when a peer accesses the co-operative peering network (hereafter simply called "The Co-operative") is fundamental to overcoming the fourth deficiency of client/server approaches.

Third, unlike peer-to-peer solutions, peers within the present embodiment are not necessarily identical, nor do they necessarily have equivalent capabilities and responsibilities. A peer within the present embodiment running on a mobile phone, for example, does not even attempt to take on the role of a jury peer as its memory, processing power, and bandwidth are insufficient for the task. This distinction is fundamental to overcoming the sixth deficiencies of peer-to-peer approaches.

Fourth, one or more peers may be "Super Peers" with responsibilities beyond the vast majority of peers—extra responsibilities that the vast majority of peers have the software code to perform, but do not perform because other peers are more suitable (due to their capabilities or other factors).

For example, given the need for security and trust whenever money is involved or products are to be exchanged, Super Peers may take on the additional role of being a certified witness to a transaction. Or, they may take on the additional role of being a certified guide, proposing the composition of the jury for the next step in a random-access peering situation.

This distinctive ability to dynamically designate/authorise certain peers to perform additional functions and the ability to include such a Super Peer in a tri-peering situation is fundamental to overcoming the seventh deficiency of client/server approaches, as such services add value and thus could be provided for a small fee.

Fifth, unlike client/server servers, however, Super Peers need not be dedicated to providing these more server-like tasks (although they can be dedicated to such tasks). Super Peers can continue to act as a normal peer, playing more traditional peering roles for their user. In any event, Super Peers need not perform the same task for more than a short period since joint peers share the extra responsibilities and as more capable (or simply less loaded) peers join The Co-operative, existing Super Peers are freed from their tasks.

This distinctive ability of the network to dynamically reconfigure itself to maximise the use of resources and to replicate data and responsibilities and of the peers to perform tasks jointly is fundamental to overcoming the eighth deficiency of client/server approaches.

Sixth, unlike peer-to-peer solutions, peers within the present embodiment (in particular, Super Peers) can have responsibilities in transaction to which they are not a party. Such responsibilities include, but are not limited to, being a witness, an arbitrator (e.g. as a jury member running an auction), or a guide. This distinction is fundamental to overcoming the first, second, fifth, and eighth deficiencies of peer-to-peer approaches.

The fact that the presence of a certified witness to a transaction enables two uncertified peers to have sufficient confidence in the process to enter into an exchange involving money and physical goods is fundamental to overcoming the first and second deficiencies of peer-to-peer approaches.

Seventh, unlike peer-to-peer solutions, The Co-operative has a memory—certain peers are given the task of storing the demand and other preferences of other peers who intend to go off-line.

Rather than attempting to capture full details of supply—similar to the pre-existing database of products hosted by the server in client/server approaches—The Co-operative captures demand. It is more powerful to capture demand instead of supply because demand is more dynamic. Before it is fulfilled, its continued existence can be verified each time the relevant user logs on. Until it is fulfilled, it is relevant to almost every other peer on the network (since they may have the means to fulfil the demand but have not advertised that fact). When it is fulfilled, a transaction will almost assuredly result. Once it is fulfilled, the demand ceases to exist.

The burden of capturing demand is less than the burden of capturing supply because: 1) current demand is of relevance to almost every peer on the network and is of particular relevance to particularly large peers, 2) demand tends to grow linearly as the network expands, whereas supply tends to grow exponentially as users speculatively advertise everything that is potentially available, and 3) demand is discrete, limited, and attributable unlike the supply of certain products (which may be in near infinite supply or may be only potentially available).

This distinctive emphasis on capturing and remembering demand is fundamental to overcoming the third and fourth deficiencies of peer-to-peer approaches, and the ninth deficiency of client/server approaches.

More significantly perhaps from a commercial perspective (the seventh deficiency of peer-to-peer approaches) having a reservoir of current demand represents a compelling reason for new users to download the software for the present embodiment and to check-in regularly with The Co-operative.

Eighth, unlike existing peer-to-peer solutions, the present embodiment creates opportunities for the host of the network to add value to transactions—in the form of acting as a witness to transactions, of certifying users, of managing auction and other group negotiations (as a jury member, a guide, or otherwise), of providing escrow services (holding cash or goods in a swap or otherwise), of certifying the quality of physical goods, of arbitrating and resolving disputes, of collecting debts, and the like. Each of these is an opportunity for the host of the network to make a profit. This is fundamental to overcoming the seventh deficiency of peer-to-peer approaches.

DISCLOSURE OF THE INVENTION

In one aspect the invention provides for a method of operating a computing device wherein said device is adapted to perform a supervisory and/or supporting role in relation to peers in a peer-to-peer network, the method including the steps of:

a) the computing device establishing contact with a plurality of peers which are to be the subject of the supervision and/or support role; and b) providing said supervision and/or support.

In a further aspect the invention provides for a method of operating a peer-to-peer network, wherein the network includes one or more super-peers adapted to perform a supervisory and/or supporting role, the method including the steps of:

a) at least one super-peer receiving notification that said role is requested;

b) the at least one super-peer establishing contact with a plurality of peers which are to be the subject of the supervision and/or support role; and c) providing said supervision and/or support.

In a preferred embodiment the role is to hold data for the benefit of one or more other peers, where the holding role includes the steps of:

a) the super-peer receiving the data;

b) recording the received data;

c) receiving requests for the data from users of the network or a process running on the network;

d) retrieving data based on the request; and e) transmitting the result to the requesting user or process In a further embodiment, preferably the role is to assign one or more operations to one or more other peers, where the assignment role includes the steps of:

a) the super-peer deciding that a peer is required to perform an operation;

b) selecting a peer from a list of available peers;

c) retrieving details of the selected peer; and d) instructing the selected peer to perform the operation.

In yet a further embodiment, preferably the role is to share the performance of an operation with one or more other peers and wherein the sharing role includes the steps of:

a) the super-peer receiving notification that a peering relationship is required, a peering relationship being a method of operating with one or more other peers so as to share the performance of an operation;

b) determining the identity of one or more siblings required to implement the peering relationship, siblings being the other peers who share in the performance of the operation;

c) establishing the peering relationship with the one or more siblings;

d) maintaining synchronisation between the super-peer and the siblings;

e) securing replacement siblings as required; and f) creating new siblings as required.

In yet a further alternative embodiment the role is to provide to users not able to access the network with an interface to the network, where the interfacing role includes the steps of:

a) the super-peer receiving instructions from a user who is unable to access the network, wherein the instructions are received independently of the network;

b) executing the instructions;

c) obtaining the results of the execution; and d) transmitting the results to the user, wherein the results are transmitted independently of the network.

In a further aspect the invention provides for a system including a computer device, wherein the device is adapted to support the interaction of a plurality of other computing devices who are otherwise communicating with each other directly over a network, the method including the steps of:

a) the computing device establishing contact with a plurality of computing devices which are to be the supported; and b) providing said support.

BRIEF DESCRIPTION OF THE DRAWINGS/FIGURES

The present embodiment of the invention will now be illustrated, by way of example only, with reference to the accompanying drawings, in which:

Figure 3:
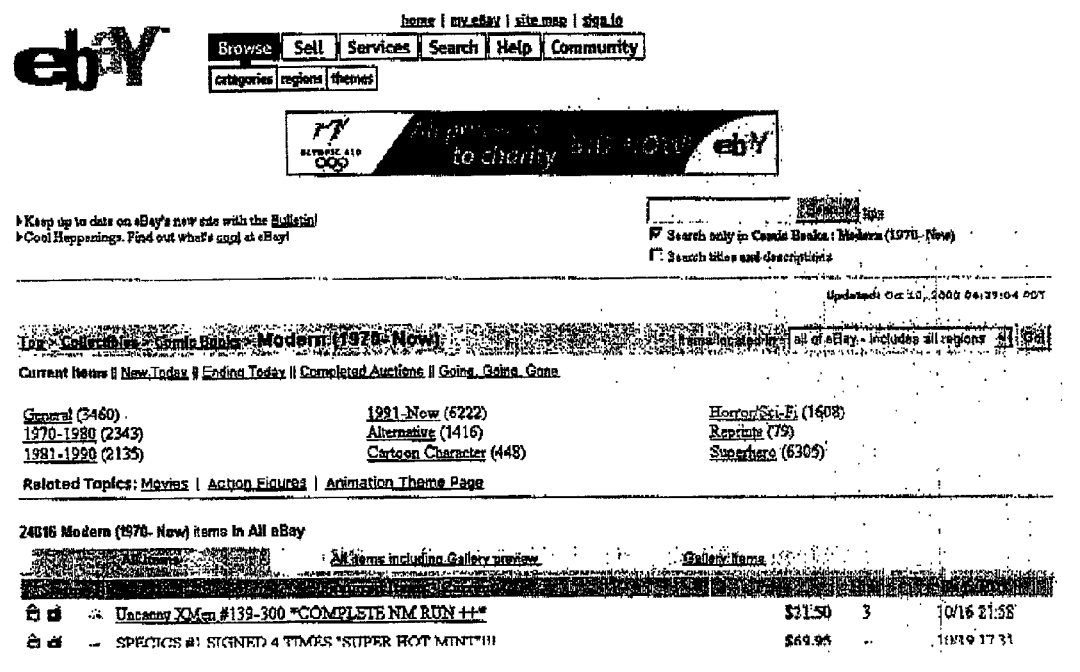

FIG. 3 is a screen display produced to facilitate transactions using the client-server auction approach, a method known in the prior art;

FIG. 4a (spanning two pages) is screen display corresponding to those of FIGS. 1, 2, and 3, in the present embodiment of the invention;

FIGS. 4b through 4e are further screen displays that appear as the user interacts with the present embodiment of the invention shown in FIG. 4a;

FIGS. 5a and 5b are examples of the two standard formats used to organise collection data and file extracts showing how this format is encoded in a number of standard software programmes;

Figure 6A:
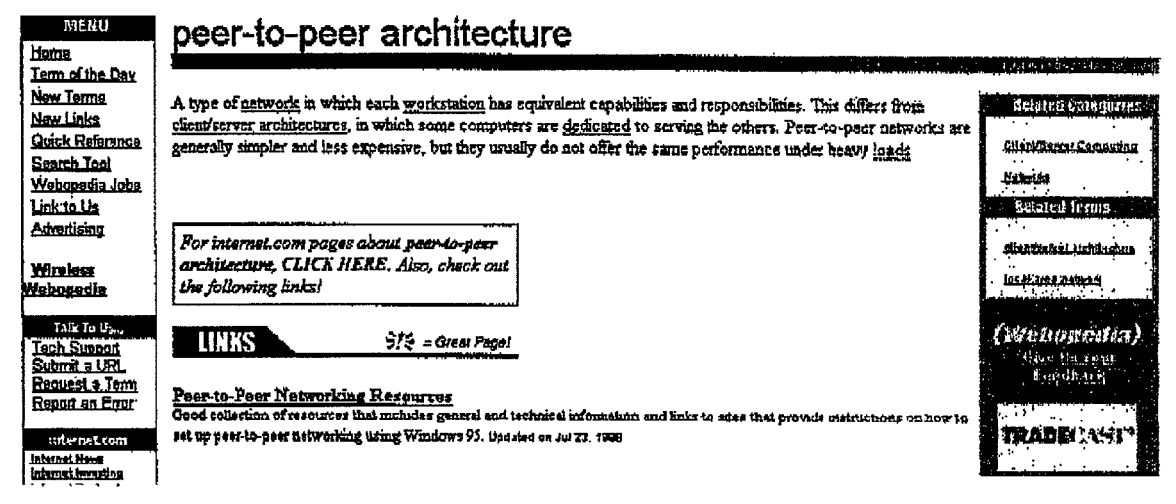
Figure 6D:
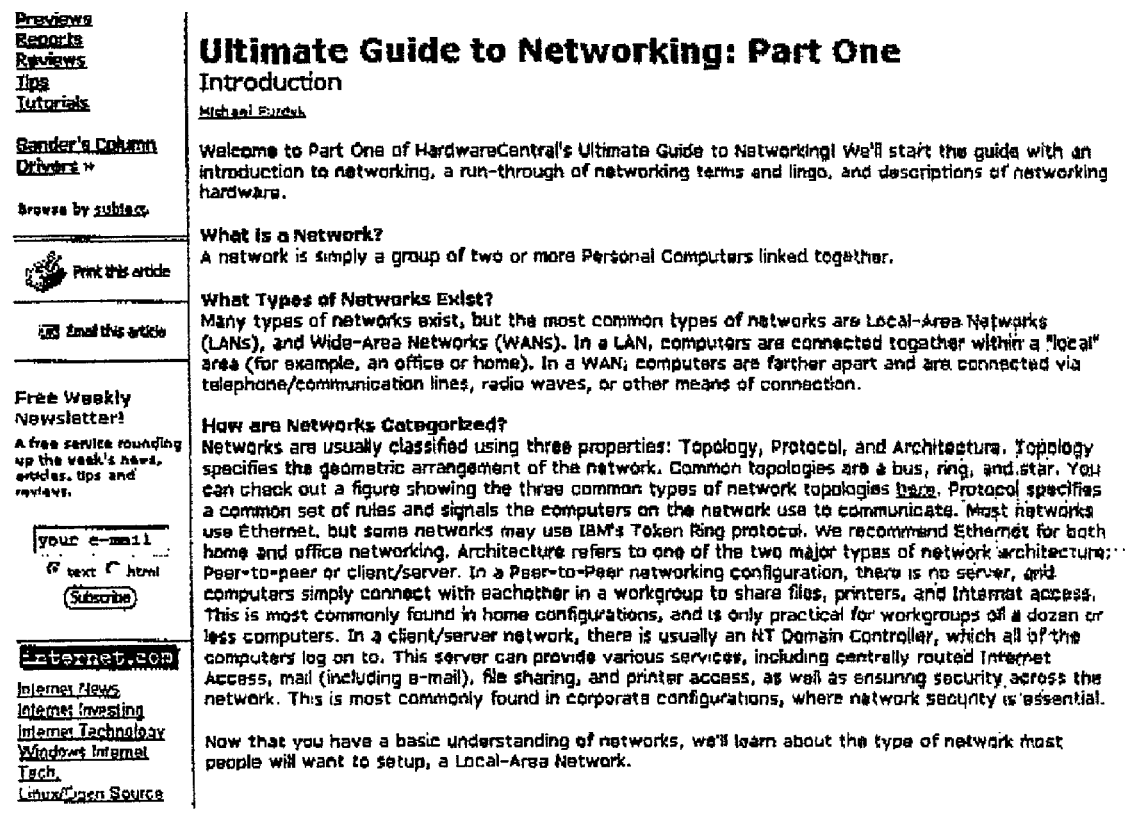

FIGS. 6a through 6d are the results of a search of Internet sources for information on peer-to-peer and client-server network architectures.

DETAILED DESCRIPTION OF THE INVENTION

Figure 1:
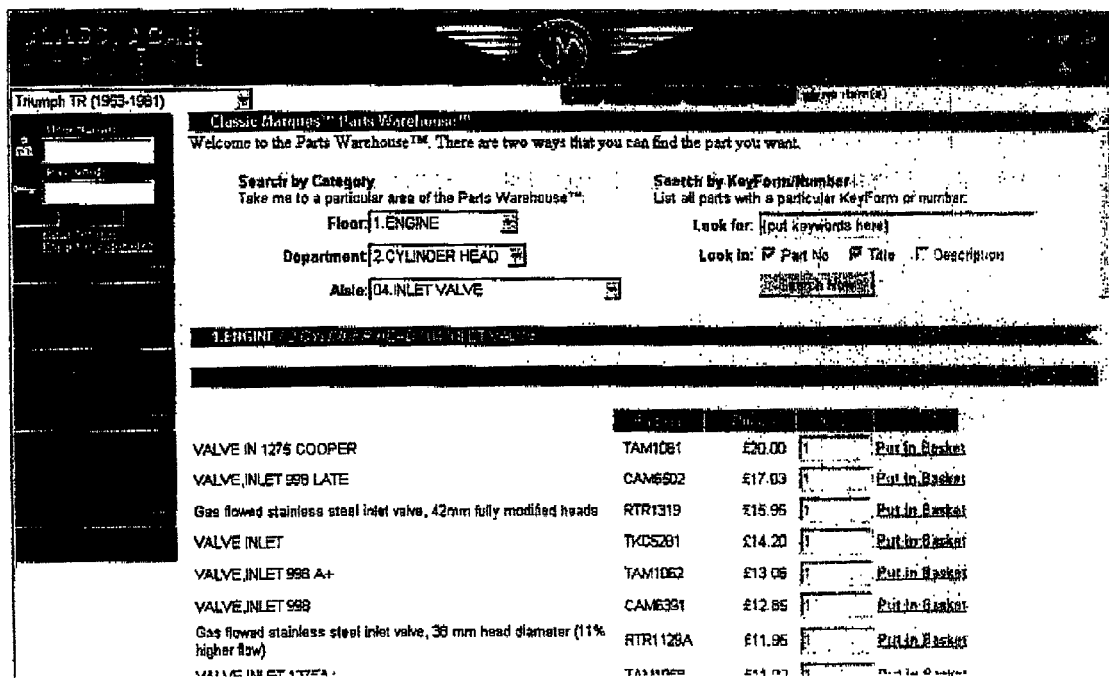
FIG. 1 is a screen display produced to facilitate transactions using the general client-server approach, a method known in the prior art.
Figure 2:
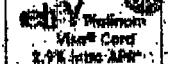
FIG. 2 is a screen display produced to facilitate transactions using the client-server notice board approach, a method known in the prior art.
Figure 6B:
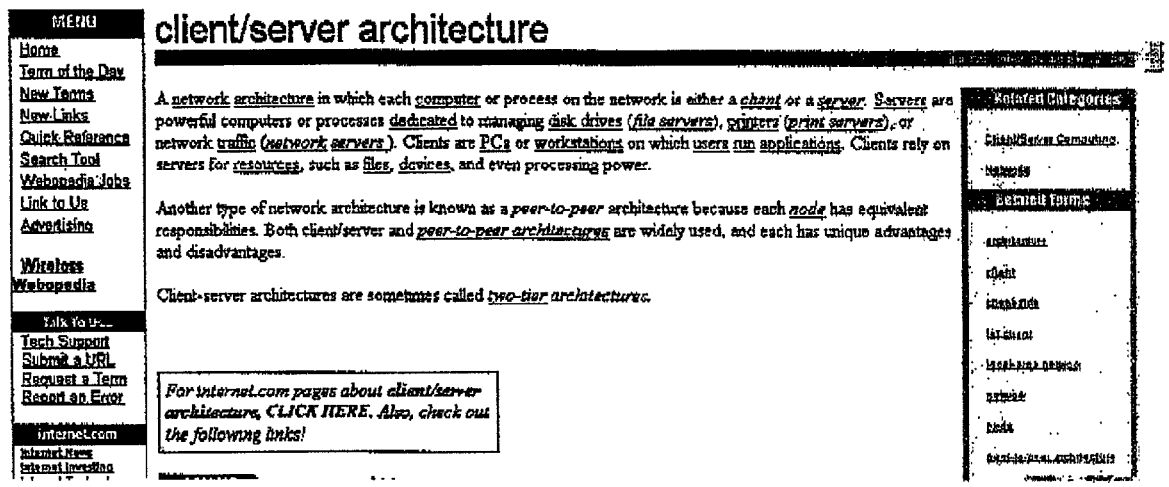
Figure 6C:
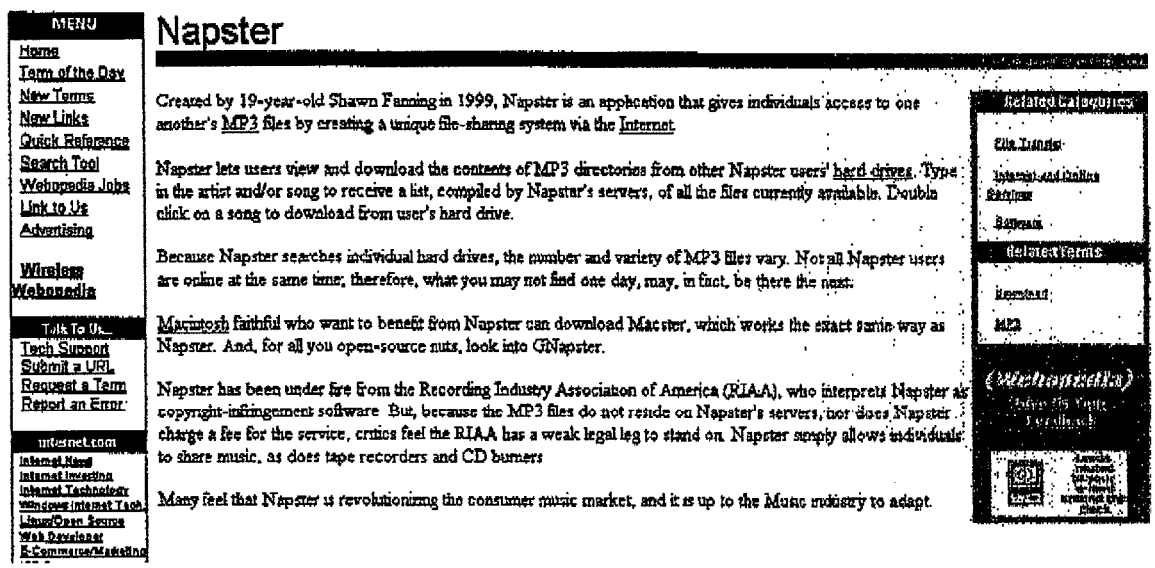

FIG. 4a is a screen display corresponding to one embodiment of the invention, the present embodiment. The screen display is in four sections corresponding to four of the five distinct functional areas of the invention—the fifth functional area being "back office" functionality.

"What I Have" Functionality

The primary purpose of the present embodiment is to help match supply and demand for selected products, initially collectibles (e.g. comic books). Key to this is gaining access to and then making available to The Co-operative the complete list of all products potentially available for sale, complete with details of their owners.

This task is simplified by the fact that many collectors keep some sort of electronic record of the contents of their collection. Thus, one of the first things a new user of the present embodiment does, is identify to the application the existing file(s) on his machine that list his relevant possessions. In addition, for each file the user indicates the category(ies) of collectibles (e.g. comics, coins, stamps) from a drop box. The list of valid categories is downloaded with the present embodiment. This list is automatically updated each time the user connects to The Co-operative.

For each file, the present embodiment records the file name, location, date of last modification, and the categories of items in that file. The application then parses the file to extract its contents. There appears to be two standard layouts that people use to record details of their collection(s)—see examples in FIGS. 5a and 5b. As a result, the format of the data file(s) containing the contents of the user's collection is irrelevant. A pattern-matching algorithm is used to parse the contents and extract the relevant information.

In FIGS. 5a and 5b, the example of the standard layouts is followed by relevant extracts from data files using these layouts in Microsoft Excel, Microsoft Word, Lotus 123, and Lotus Word Pro formats. As can be seen, regardless of the format, the relevant information is straightforward to identify and extract.

The steps of the parsing exercise thus are as follows. First, the application checks to see if the file is a known format (e.g. Excel, Word, Word Pro, 123). If it is, then the pattern of the file format is known. If the pattern is not known, then the file is searched for valid items (e.g. comic book titles) and gradings (e.g. mint condition). During this search, capitalisation, spaces, and small connecting words (e.g. "the" and "of") are ignored. In this way relevant aspects of unknown file formats can be deduced.

The list of known valid item titles in each category (e.g. the various comic book titles, the various denomination of coins) and valid gradings (e.g. mint, near mint, very good, good) are downloaded with the present embodiment and automatically updated each time the user connects to The Co-operative.

From the parsing exercise, all valid entries are extracted and put into a new, local database. All unrecognised text that should be a valid entry (based of its position in the pattern) is also extracted.

Under the assumption that unrecognised item titles and gradings may have been misspelt, alternatives are suggested based on a wild card search algorithm. Specifically, the list of valid items (or gradings) is searched for matches against every combination of the unrecognised text with adjacent triplets of letters replaced by a wild card—still with capitalisation, spaces, and small connecting words ignored. For example, if the unrecognised text is "The Invisilbe Man" then the list of valid item titles is search for:
"*isilbeman", "i*silbeman",
"in*ilbeman", "inv*lbeman",
"invi*beman", "invis*eman",
"invisi*man", "invisil*an",
"invisilb*n", and "invisilbe*".

The user then has the option of replacing the unrecognised text with a suggested alternative, or with any valid item title (or grading as appropriate), or declaring the unrecognised text to be a new item title (but not a new grading).

Once parsed, the relevant information is put into a two-part table. The first part lists each of the items titles (in alphabetical order) in this user's collection (with a flag as to whether it was originally unrecognised as a valid item title). The second part gives the relevant details (in numerical order). By way of example, the data in both layout examples in FIG. 5 would result in the following table:

| ItemTitle | ItemNo. | NewTitle |
|---|---|---|
| ironman | 1 | N |
| spiderman | 2 | N |

| ItemNo. | Version | Condition | Notes | Status |
|---|---|---|---|---|
| 1 | 11 | 1 | Miscellaneous facts | 0 |
| 1 | 203 | 4 | Other details | 0 |
| 1 | 204 | 6 | | 0 |
| 2 | 5 | 3 | Even more items of interest | 0 |

Note:
Condition translates as follows:
1 = mint,
2 = near mint,
3 = very good,
4 = good,
5 = okay, and
6 = poor.
Status translates as follows:
0 = showing,
1 = hidden,
2.xxxxxxyy = Selling for US$ xxxxxx.yy,
3.xxxxxxxx = Under Open Auction (auction no.xxxxxxxx),
4.xxxxxxxx = Under Closed Auction (auction no.xxxxxxxx),
5.xxxxxxxx = Under Dutch Auction (auction no.xxxxxxxx),
6.xxxxxxxx = Under Offer (transaction no.xxxxxxxx), and
7.xxxxxxxx = Sold (transaction no.xxxxxxxx).
Note: This list is not exhaustive, Also, the "Under Offer" categorisation tends to be used for swaps, after a swap offer has been received and while the receiver is still evaluating the offer.

Whenever the user runs the present embodiment, these details are displayed in the relevant part of the window as per FIG. 4. Whenever the user connects to The Co-operative, the application sends the first part of the two-part table to a Super Peer (a Database Holder to be exact, see below), which replies with current "book values" and any other information that might be relevant (e.g. an image of the object in question, some interesting facts about it, etc). A similar message to another Super Peer (a Demand Holder) yields all existing requests/demands for products in that category for all versions of that item in all conditions. A third message to a third Super Peer (a Transaction Creator) yields updated details on the various auctions and transactions in process. The present embodiment then uses this information to complete the details shown in the first section of FIG. 4a, converting currencies as required (note: all values are stored in US dollars).

By way of example, the relevant requests/demands (those for the correct version and condition) are then stored in a table with the following format:

| User | SendTime | ItemTitle | Version | Condition | Offer |
|---|---|---|---|---|---|
| TimeLord | 21/10/2000 13:14 GMT | ironman | 4 | '3−' | 2.00006 |
| Snoopy | 21/10/2000 13:16 GMT | ironman | 4 | '1' | — |
| ac573 | 21/10/2000 13:17 GMT | ironman | 8 | '2+' | — |
| Tim13 | 21/10/2000 13:21 GMT | ironman | 12 | '3+' | 2.000075 |

Note:
The offer field is encoded similar to the status field of the previous table. Thus, "2.00006" means that US $60 is being offered.

FIG. 4a is a screen display corresponding to the top level of detail provided by the present embodiment. The other screen displays in FIG. 4 demonstrate how a user might "drill down" to further information. For example, FIG. 4b is part of a screen display corresponding to what would appear should the user click on one of the "General Interest" lines.

It is recognised that some collectors do not keep an electronic record of the contents of their collection. For these individuals, other tools will be made available to help them generate their own two-part tables. For comic books and other products with an ISBN product barcode, software will be provided to gather the relevant information from a bar code reader. There is some expectation that barcode readers will become standard attachments to higher-end mobile phones and palm-top computers. Note: parsing the information from a barcode reader to build a two-part table on the user's PC (or other device) is a classic application of the joint peering capability of the co-operative peering network architecture. Co-operative peering would support this sort of joint working even if the PC (or other device) were not even powered on when the barcode reader is being used (by passing information in messages via the Messaging Super Peer).

For collectors without an electronic record and without a barcode reader, the functionality has been included in the present embodiment to enter the data manually (using the Add, Delete, and Modify buttons).

"What I Want" Functionality

As stated above, the primary purpose of the present embodiment is to help match supply and demand for selected products. The "What I Have" functionality concentrates on determining and then making available details about the supply. It is the purpose of the "What I Want" functionality to capture and broadcast details of demand.

As can be seen in FIG. 4a, entering demand is fairly straightforward. By hitting the Add button, the user is asked to enter the item that they are interested in. The default is that the item is of the current category (e.g. a comic book, or a coin) and the current item type (e.g. an Ironman comic, or a twopenny bit), the user can select any category and item type. The user is then asked to enter the version (e.g. issue number 4, or year 1934) and the desired condition.

Multiple versions can be entered, although separate demand records will be generated. In the version field, a comma acts as a Logical AND and a hyphen means that the full range (inclusive) is desired. Thus, "2-4,7" translates into separate demand statements for issues 2, 3, 4, and 7.

Multiple conditions can be entered, where a "+" means this condition or better and a "−" means this condition or worse. If two conditions are listed with a hyphen between, that means any condition in the range (inclusive) specified.

Optionally, the user is able to include an offer price. Any of this information can be modified at any time (although once the record is entered, the version field is used to generate separate demand records). Deletions and modifications can be made to a group of records.

Once a demand record has been generated, it is stored in the following local table:

| DemandNo. | ItemTitle | Version | Condition | Offer |
|---|---|---|---|---|
| 1 | ironman | 4 | '3−' | 2.00006 |

Whenever the user runs the present embodiment, details from the demand table are displayed in the relevant part of the window as per FIG. 4a. Whenever the user connects to The Co-operative, the application sends the demand table to a Super Peer (a Demand Super Peer), which stores this information and forwards it to all other users who may potentially have the item desired.

The software of the present embodiment of the users with the desired item then gets into direct contact with the software of the present embodiment of the current user to confirm availability, the details of the item that is available, the details of the user, and any price requested or auctions being operated. Note: If the software of the present embodiment is responding to a demand request and the source of the demand is not online (i.e. because they logged off before the reply was sent, or because they were not logged on to begin with as the Demand Super Peer simply forwarded a relevant though dated demand request) then the reply is lodged with a Super Peer (a Messaging Super Peer) for later forwarding. It is the responsibility of the software of the present embodiment of the user who generated the demand request to handle multiple replies. This is discussed in detail later.

Demand information received is stored locally as follows:

| DemandNo | Condition | User | SendTime | OfferType |
|---|---|---|---|---|
| 1 | 4 | Timelord | 21/10/2000 13:14 GMT | 2.000085 |
| 1 | 3 | Snoopy | 21/10/2000 13:16 GMT | 0 |
| 1 | 4 | ac573 | 21/10/2000 13:17 GMT | 0 |
| 1 | 5 | Tim13 | 21/10/2000 13:21 GMT | 3.4F82AE72 |

SendTime is the time that the offer was sent. Individual users are only allowed to have one valid offer (for a given category, item type, and condition) at a time. The most recent offer supersedes all previous offers. This filtration of demand is apply by both the Demand Holders and the local peer.

OfferType translate as follows:
0=showing, but no suggested price is given
2.xxxxxxyy=Selling for US$ xxxxxx.yy,
3.xxxxxxxx=Under Open Auction (auction no.xxxxxxxx),
4.xxxxxxxx=Under Closed Auction (auction no.xxxxxxxx),
5.xxxxxxxx=Under Dutch Auction (auction no.xxxxxxxx),
6.xxxxxxxx=Under Offer (transaction no.xxxxxxxx), and
7.xxxxxxxx=Sold (transaction no.xxxxxxxx).

"Who's Online" Functionality

A secondary purpose of the present embodiment is to facilitate the creation of a community around the categories of items being traded. Such a community is supported in three ways: 1) with the ability for users to chat publicly or privately with other users who are online at the time; 2) with the ability for users to send messages privately to other others whether they are online or off; and 3) with the ability for users to post public messages. The "Who's Online" functionality intends to serve the first of these.

When a user logs into The Co-operative, their presence is registered with a Super Peer (a Login Super Peer), who shares this information with all other peers (the details of which are discussed later). As part of the application set-up process, each user is asked to identify the "chat rooms" for which they want to be members. The list of existing "chat rooms" is downloaded with the present embodiment (in particular a Chat Room Guide) and automatically updated each time the user connects to The Co-operative.

The "Who's Online" section (see FIG. 4a) then lists all users (in a scrolling list box), who are currently online and who are members of one of the "chat rooms" that also has the current user as a member. The list of users is sorted locally into three sections, each of which is alphabetised by username. The first section are users flagged as "friends" (this flagging is stored locally). The second section are users in the room corresponding to the current item title (Iron Man in the example in FIG. 4a). The third section are users who are in a different room to which the current user is a member (the list of rooms of which the user of is a member is also stored locally). The database underlying these details has the following information:

In addition, the "Who's Online" section allows the user to open up a separate "chat room" window (see FIG. 4e)—corresponding to any "chat room" whether the current user is a member or not. If the user is are not a member, then they are made a temporary member for as long as the window corresponding to the chat room is open.

For each chat room, the user may provide a textual description of themselves (which is stored locally), the default being the user's geographic location and the size of their collection in titles.

From the "chat room" window. A user can post a public message to the chat room. Private messages can be sent to other users directly. Private messages trigger the creation of a "private chat with XXX" window on both user's systems, if such windows do not already exist.

All messaging whether private or public is handled directly by the individual peers. When a user enters a chat room, the Super Peer managing the attendance list is notified. This Super Peer records the presence of the new user and forwards the IP addresses of all existing users to the new user. It is then the responsibility of the new user's the software of the present embodiment to "introduce" themselves to all the existing users. Each introduction is acknowledged. The Super Peer is notified of any introductions that are not acknowledged as it is likely that that user is no longer in the room.

The Super Peer is only informed about who is or is not in the room. No messages are sent via the Super Peer. Rather, when a user wants to post a public message, his software of the present embodiment sends the message to every other user in the room. If the user wants to send a private message, his software of the present embodiment sends that message directly to the other user.

"Messages" Functionality

As mentioned above, building a community requires the ability to chat publicly or privately with other users who are both online and offline. The "Who's Online" functionality caters for public and private communication with those who are online. As far as possible, users will be encouraged to use email (or whatever private messaging functionality already exists on the network that they are using) for private communications with others who are offline. The "Messaging" functionality is primarily for public communication with people who are offline but has the secondary function of handling the occasional private message (e.g. messages

| No. | Room |
|---|---|
| 1 | ironman |
| 2 | spiderman |
| 3 | blackavenger |
| 4 | thevigilante |
| 5 | justiceleague |
| 6 | superman |

| Room | User | IP Host | Other Rooms | Location | Size |
|---|---|---|---|---|---|
| 1 | BZ137 | 66.14.254.5 | '3, 4' | New York, USA | 21 |
| 1 | James40 | 59.219.128.168 | '2' | Boston, USA | 56 |
| 1 | TimeLord | 203.172.147.49 | '5, 6' | London, UK | 257 |
| 2 | Chuck17 | 252.129.206.126 |  | Manchester, UK | 128 |

Note:
The first three columns of the second part of the table are retrieved from the Super Peer maintaining the attendee list for the room (the relevant Chat Moderator). The other three columns are retrieved directly from the relevant peer.

that could not be delivered because the user went offline after the message was sent, but before it arrived).

The use of email (or equivalent) for private communication will be encouraged in a number of ways. First, when a user clicks on the name of a particular user so as to pull up the details of that user, these details will include the user's email address (if available). As an aside, users are given five options with regard to the display of their email address (which is set when they first register with The Co-operative but can be changed at any point thereafter): 1) the address should be stored with the Super Peers (a Directory Super Peer) and displayed in full whenever someone requests details on the user; 2) the address should be stored, but should only be displayed in part; 3) the address should not be stored (and thus there is nothing to display when the user is offline) but should be displayed in full whenever someone requests details and the user is online; 4) the address is not stored and is only displaying in part and only then when the user is online; and 5) the address is not stored and is not displayed.

This preference is stored both locally and with the Directory Super Peer. Normally, the software of the present embodiment would first request an email address directly from the associated peer. Only if no reply is received would the Directory Super Peer be contacted.

Email addresses that are stored by the Directory Super Peers are stored with the user name and password. Emails that are displayed in part, are partially obscured when included in a reply (e.g. instead of replying with "TimeLord@yahoo.com" the peer will send "TimeLord@ . . . "). Whether the address is displayed in full or part, a user may click on the address in their own software of the present embodiment and an email editing window will be opened. If the full email address is known, the message is sent in the usual way. If only a partial address is known, the mail is routed via an Email Forwarding Super Peer, who then queries the relevant peer to determine the full address so that the email can be forwarded.

Implementation of the public notice board is more straightforward. Specific Super Peers (the Board Moderators) are designated as the keeper of the notice board for a specific topic. All postings to the notice board are sent to one of these Super Peers. Whenever a user wants to view a notice board, his software of the present embodiment can either request a list of headings of all messages or can request the body of individual messages. Users can create new notice boards as required. When a request is made for a new notice board, a Super Peer (a Notice Board Guide) appoints an new set of Super Peers to manage the board as Board Moderators.

Occasionally there will be situations where private messages can not be routed via email. Mainly this will occur when one peer sends a message to a second peer who it believes is online, but receipt of the message is not acknowledged. The originating peer will then attempt to resend the message two more times after which, it will assume that the recipient peer has gone offline.

If a message is undeliverable in this way, one of three things will occur. First, if the message is not important (e.g. it is text for a public chat room), the message is simply deleted. Second, if the message is initiating the next step in a transaction (e.g. placing a new bid with an existing auction), generally the message is deleted, the transaction is undone, and the user is notified. Third, if the message is an acknowledgement that a previous communication has been received, generally the acknowledgement will be forwarded to the Super Peers for later forwarding to the recipient. Regardless, undelivered private messages are forwarded to users via the Message Super Peers.

Mobile Users

FIGS. 4a through 4e have concentrated on how the present embodiment would appear on a device with a full screen (e.g. a personal computer, web TV, palm tops to a certain extent). Some users may run the present embodiment from devices with more limited output capabilities (e.g. mobile phones, WAP phones, other palm tops). In these cases, the present embodiment presents as a series of menu options. The top level menu has five options: "I Have", "I Want", "Who's Online", "Messages", and "Administration", conforming to the four sections and the menus shown in FIG. 4a plus the "back office" functions.

If the user selects the "I Want" option, for example, they are presented with a second menu listing their active "wants". In the example shown in FIG. 4a, this menu would have four options, corresponding to "Iron Man 4", "Iron Man 6", "Iron Man 6", and "Iron Man 20". Similarly, if the user selects "I Have" or either of the other section headings, the details under that heading as shown in FIG. 4a are returned as the next menu.

Moving back to the "I Want" example, selecting one of these issue/version options opens up the next level of detail. If the user selects "Iron Man 4" in the FIG. 4 example, they will then be presented with a ten option menu corresponding to the 10 products "generally available" (similar to FIG. 4c).

It should be noted that, in addition to having limited screen real estate, some devices may have limited processing power or memory. A mobile phone, for example, might not have the memory capacity to locally store the user's current collection as listed in the "I Have" section. Even if it could, it would be inefficient for the user to maintain two copies of the same data—one on his PC and one on his mobile, for example. In these cases joint peering comes into its own.

The mechanics of joint peering are discussed in greater detail below. In order for joint peering to operate in this example, the user must have left their PC powered on and logged into The Co-operative when he goes out with his mobile phone. Currently, doing this is prohibitively expensive; however, as the use of fixed price Internet access tariffs grows, this practice will become more common.

The essence, then, of joint peering is that two peers act in unison. All messages sent out by any one peer are copied to all peers in the joint peering set. All messages received by any one peer are copied to all peers in the joint peering set. Certain messages are passed between members of the joint peering set to ensure that messages are sent out from the appropriate peer. Note: The actual implementation is more complex than these simple rules, but the sense of this description is correct.

In the specific case of a mobile user with their "I Have" database on their PC at home, the present embodiment on the mobile phone would "log into" the user's PC and not into The Co-operative directly. If the PC is not logged into The Co-operative, the mobile phone would then force it to log in.

Since the PC contains the "I Have" database, upon logging into The Co-operative, the PC would receive relevant "wants" from the Super Peers. As a joint peering partner, the PC would then forward these details to the mobile phone.

Some messages (e.g. chat room messages) would be sent directly from the mobile phone to other peers in The Co-operative. Other messages (e.g. status changes to existing "I Have"s) will be sent to The Co-operative via the PC. How each message is routed depends on the capabilities of the various members of the joint peering set and the physical location of various resources (e.g. the "I Have" database).

Web Television

Web TV is another interesting case of a device with limited capabilities that may be used to connect to The Co-operative. Currently, Web TV comes in a number of forms. The most popular at present being a regular television with a fully functional web browser, email editor, and news group reader built in. Presently, Web TV supports HTML, JavaScript, and a range of data file formats (e.g. image, audio, movie, and animation files). It comes with a ROM cache for storing screen icons and an interface port for a SmartCard, containing user details.

At present, Web TV does not support Java or any other programming languages, has extremely limited memory storage space, and has no ability (other than via the ROM cache and the SmartCard, both of which are inappropriate in this case) to store data between sessions. These limitations mean that a Web TV user will be unable to download and run the peer application necessary to access The Co-operative and regardless would be unable to store the various local information necessary to interact productively with other peers and The Co-operative.

Joint peering is the obvious solution for allowing a user accessing the Internet via Web TV to interact with The Co-operative. A specific Web TV session being operated by the user could either joint-peer with the user's own PC otherwise connected to the network, or (as is more likely since people using Web TV rarely have a separate PC connected to the network) they could joint-peer with a "client/server peering site".

A client/server peering site appears to be a normal HTML or other client/server application to the end user (the Web TV user in this case). As far as The Co-operative and the other peers connected to The Co-operative are concerned, however, a client/server peering site is merely another peer (hereafter a "client/server peer serving sub-clients" or simply a "client/server peer").

By way of example, a client/server peering site could operate as follows:

Individual users would register with the client/server peering site. Their Web TV session could be configured to log them into the site automatically by storing the relevant information on the user's SmartCard. For a fee, the client/server peering site would maintain "local" databases for the user comprising the current contents of their collection, user preferences, and the like. Then when the user accesses the client/server peering site, the server would extract the relevant information (e.g. demand information) from The Co-operative in the normal way.

The server of the client/server peering site could either log into The Co-operative once (and thus consolidate the requests of its various clients), or it would log into The Co-operative once for each client. Note: special routing flags are supported as suffixes to the host address to support this ability.

However the individual clients are represented on The Co-operative, the client/server peering site would dynamically generate pages of information based on information received from The Co-operative to be viewed in the normal way by the individual clients. Data input from the individual clients would be gathered in the normal way (typically via HTML forms) and would then be reformatted into relevant messages.

Again, a client/server peering site is nothing more than a peer application running on a device other than the device controlling the user's display, and routing and potentially consolidating the messages of potentially a number of users.

Super Peers

Super Peers are a key distinguishing characteristic of co-operative peering networks. Peer-to-peer networks do not have Super Peers as peer-to-peer communication is strictly between two entities. Furthermore, peer-to-peer networks have no memory whatsoever. Once a specific peer has received, processed, and forwarded a message, it is dead as far as that peer is concerned. Once a message has been passed around the full extent of the network, it is dead in total. Super Peers make co-operative peering networks different in that they act as a memory bank for the network.

By extension, Super Peers distinguish co-operative peering networks from client-server networks. Unlike servers in a client-server network, Super Peers provide only very limited functionality. The bulk of processing is handled locally by the individual peers. The vast majority of communications (that does not need to be remembered) is passed directly from one peer to another without reference to any Super Peers. Indeed a Super Peer providing a specific central service yesterday may not be providing that same service today.

In the chat rooms, for example, the Super Peers only maintain the attendance list, they are not involved in the broadcasting/passing of the individual messages.

Similarly, the Super Peers make no attempt to specifically match supply and demand. If User X wants an mint condition Iron Man 4 and User Y has some Iron Man comics (regardless of the issue number and their condition), the Super Peers forward all Iron Man requests. It is the local peer that determines whether there is a match. It is the local peer who notifies the requester's peer that there is a match. It is the requester's peer who processes these notifications to summarise the number of items matching the request and the terms under which each is available.

Similarly, in an open auction, the Super Peers only maintains a record of each bid, but it is the local peer who acknowledges receipt of the bid and informs bidders who won. It is the local user who determines whether a specific bid is disqualified.

Similarly, the Super Peers are not a party to a transaction. Regardless of the validity of an offer price posted with an original want request, no offer is binding until the two relevant peers make direct contact and an agreement is reached. A Super Peer may "witness" the agreement, but they are not party to it—acting neither as agent for the buyer or the seller.

Furthermore, the Super Peers make no attempt to manage the network.

As far as reasonably possible, all peers (whether they are Super Peers or not) have the same code. Becoming a Super Peer then has nothing to do with the software that is running on the user's device. Rather, it has to do with how often that device intends to be connected to The Co-operative and how capable the device is.

Similarly, a Secure Super Peer runs the same code of the present embodiment as any other peer. The difference is that a Secure Super Peer has security certificates that verify its identity, it intends to be connected to The Co-operative full time, and it has been assigned certain extra responsibilities.

Potential Super Peers are identified automatically during the registration process. Any computer that intends to be connected to The Co-operative 24 hours a day is eligible to be a Super Peer. The key word is "intention". It is recognised that machines and networks go down. Joint peering (and jury peering) ensures that all Super Peers are shadowed so that if one should go offline, the services it provides are not disrupted.

Certain Super Peers are assigned more sensitive roles. Any Super Peer with registered certificates verifying its identity is eligible to become a Secure Super Peer. Secure Super Peers get involved in transactions where security is a concern.

For services that have no security implications (e.g. the list of current users in a chat room), a regular Super Peer maintains this list. Typically, this Super Peer is shadowed by two other Super Peers. The three Super Peers use joint peering so that all three machines act as one. Individual peers interact with any of the three Super Peers, who keep their siblings informed of changes. If any Super Peer should go offline, the other two Super Peers have a new Super Peer sibling assigned.

For more critical functions, again with no security implications (e.g. the list of valid category titles), up to five Super Peers might jointly maintain the list for a specific title (e.g. Iron Man).

For functions that have security implications, Secure Super Peers are used. For particularly secure functions, instead of acting as joint peers, the Secure Super Peers act as jury peers. The difference is that with joint peering, only one peer will process any given message and will pass the result to its partners. In jury peering, all peers process each message and their results are compared to verify that there has been no tampering. In joint peering, messages are received by and sent by individual peers in the joint partnership and are then forwarded internally between the joint peers as required. In jury peering, messages are received by and sent by all jury peers with their content being verified between the jury members and the "end using" peer respectively.

Five Secure Super Peers acting jointly might maintain the list of current demand for Iron Man comics. Five Secure Super Peers acting as a jury might manage an auction.

Implementation of Co-operative Peering

As described above, co-operative peering has a number of aspects: tri-peering, jury peering, random access peering, joint peering, and dynamic unequal peering to name a few. Note: client/server peering uses the same messages as any other peer and thus is not specifically discussed.

This section describes how these various functions are implemented.

Joint Peering

The essence of joint peering is that two (or more) devices behave as if they are the same device. This state is achieved by ensuring that all messages sent by any joint peer are copied to all other joint peers if that message affects the underlying data, and that any message received by any joint peer is copied to all other joint peers if that message affects the underlying data or if the receiving peer is unable to act on it.

The trivial case of joint peering is when all joint peers have all the relevant resources—for example, the list of valid chat rooms and their moderators. In this case, any request for information can be handled by any joint peer. When a request is received, it is acted on and a reply is sent. Neither the original message nor the reply is forwarded to the other joint peers. There is no need for them to know.

Any request to change the underlying database, however, must be acted on by all joint peers. Therefore, the receiving peer acts on the message and then forwards it to its siblings (the other joint peers).

It is absolutely critical that all joint peers act on the provided information, otherwise their databases will get out of synch. Three mechanisms are of relevance here.

First, there is the FORWARD command. A one-line header is attached to a received message saying that the message is being forwarded by a joint peer. The fact that the message is forwarded is important because it ensures that the recipient does not FORWARD the message back to the sender.

Second, all messages (except acknowledgements) are acknowledged and there is a Messaging Super Peer whose sole task is to deliver undelivered messages. The PASSON command adds a one-line header to the original message, which is then passed to the Messaging Super Peer, who then forwards the message at the first opportunity. The Messaging Super Peer will only attempt to pass on a message for four days after which the message is deleted. The Messaging Super Peer acknowledges receipt of the message to be passed on, but does not report back as to whether the message is ever delivered.

Third, for critical messages the Messaging Super Peer is not used. Instead, after a suitable wait and after repeating the message twice more, the peer who sent the message which was not acknowledged simply drops the potentially "dead" sibling (using the FORGETIT command), tells the other siblings to drop the potentially "dead" sibling (using the FORGETHIM command), and then requests a new sibling from the Login Super Peer (using the DEAD command). Once the address of the new potential peer is known, the JOINTME and JOINTHIM commands are used to add the new peer to the joint peering structure.

A more complex case of joint peering is when the two peers do not have all the relevant resources. For example, a user may be out shopping and may be actively interacting with The Co-operative from his mobile phone. At the same time, the user may have his PC connected to The Co-operative at home and idle.

This case operates similar to the trivial case described above except that if one peer is unable to process a request, it forwards the request to one of its joint peer siblings with the YOUTRY command. Similarly, a given peer may not have the necessary resources to compose a command. In this case, it might QUERY the database of a joint peer.

Security is a key consideration in joint peering. Security is handled in two ways: 1) with cross logins, and 2) with transaction passwords.

The former works as follows: if Peer A is logged into Peer B then it will accept invasive commands (e.g. the query command) from Peer B, if Peer B includes Peer A's login password as an argument in the command. Thus, if a group of peers are all logged into each other then they have the authority and the ability to joint peer. Cross logins of this type require every peer in the joint peering to be individually registered with every other peer in the joint peering.

The latter is a more limited form of joint peering, limited to the resources associated with completing a specific task. Instead of having every joint peer log into every other joint peer, the joint peers share a command task/transaction password for the execution of a given task. Whenever a joint peer needs to pass an invasive command to a joint sibling, it includes the task/transaction password as an argument in the command.

The LOGIN command is used to set up the first type of joint peering. The JOINTME and JOINTHIM commands are used to set up the second type of joint peering. All commands associated with joint peering (excepting only the PASSON and DEAD commands) require that the sender of the command include as an argument either the receiver's login password or the shared task/transaction password.

Please note that the FORGETIT, FORGETHIM, and DEAD commands tend only to be used when the joint peering relationship is established between Super Peers for the purpose of providing a certain "back office" service. In these cases, the specific identity of the other joint peers is irrelevant and if one is unable to perform the necessary tasks, it is simply replaced with another Super Peer who can.

Jury Peering

The essence of jury peering is that two (or more) devices undertake the same tasks and both/all return the desired result. If the results are the same, then the task has been completed correctly and it has not been tampered with. Jury peering is achieved by ensuring that any message received by any jury peer is received by all other jury peers (from the original source) before any processing occurs. This is true regardless of whether the message is asking for information or whether it affects the underlying data.

If a response is required to a message, all members of the jury send their own reply independently. Each reply states the number of members that there are in the jury. The recipient then verifies that it has received a reply from every member of the jury and that the replies agree before any processing occurs.

Three commands underpin jury peering. With the IRECEIVED command, a one-line header is attached to a received message, forwarding it to the other members of the jury and asking if they received the same message. Acknowledgement by all other members of the jury means that the message can be processed.

It is the responsibility of the peer interacting with a jury to send an identical message to each jury member and to verify that their results agree. If the results do not agree, the peer receiving the invalid results is required to send a CANCEL message. With the CANCEL command, a one-line header is attached to the original message and this is sent to all jury members, undoing the previous command.

In addition to cancelling its original request, the peer interacting with a jury sends a LIAR command to the Login Super Peer, identifying the jury member who got the "wrong" result. The Login Super Peer tabulates LIAR alerts. If one member of a jury receives three liar flags and no other member of the jury has received any liar flags, then the offending jury member is replaced. If one member of a jury receives three liar flags and another member of the jury has received at least one liar flag, then the whole jury is disbanded and the transaction is started afresh.

If the same peer (a peer interacting with the jury, but not a member of the jury) is responsible for calling two or more jury members a liar and other peers have only called at most one member of the jury a liar, then, instead of disbanding the jury or ejecting individual jury members, the reporting peer is logged out and deregistered and his liar flags are deleted.

A jury member is ejected with the FORGETHIM command and its replacement added with a JURYHIM command, both issued by the Login Super Peer. A jury is disbanded with the DISBAND command. Upon receiving a DISBAND, each jury member messages every peer who has interacted with it on that transaction explaining that the jury has been disbanded due to suspected tampering.

Random Access Peering

The essence of random access peering is that transactions, in particular jury peered transactions, are made more secure if each step in the transaction (e.g. the receipt of each bid in an auction) is undertaken by a new jury.

Three commands are required to implement random access peering. First, the Transaction Creator must be notified when a step has been completed. This is achieved by having each jury member send an IRECEIVED message to the Transaction Creator at the same time that the message is sent to the other jury members. Similarly, each jury member sends a copy of any reply to the Transaction Creator.

Upon receiving identical IRECEIVED messages (or reply messages) from every member of the jury, the Transaction Creator can then begin the transfer process. So as to avoid contention, the Transaction Creator typically waits 20 seconds.

The transfer process is then implemented in two steps. For each peer, the Transaction Creator sends a GETSUPER message to the Login Super Peer to get the details of a new Super Peer. The Transaction Creator then sends a TRANSFERJURY message to each existing jury member, listing the specific Super Peer to whom the details are to be forwarded.

Dynamic Unequal Peering

The essence of dynamic unequal peering is that if a task can be performed by two or more peers, the task should be assigned to the peer with the greater capacity. For the present embodiment, dynamic unequal peering is employed every time a new peer logs into The Co-operative.

Each time a new peer logs in, the Login Super Peer replies with a list containing one joint/jury peer for each "back office" function. Which of the three or more peers is listed depends on the response each joint/jury member gives in reply to the LOADING command. The LOADING command forces a peer to reply with a number which combines the speed of the peer's operating system, the percentage of processing power currently in use, and the percentage of memory currently in use.

Rather than checking the loading of each joint and jury peer member before each and every listing, loadings are checked every 5 minutes. If there are three joint/jury peers, the peers are then suggested to others in the following order: 1st (fastest peer), 2nd, 1st, 3rd (slowest), 1st, 2nd, . . . (repeating). If there are five joint/jury peers, the peers are then suggested to others in the following order: 1st (fastest), 2nd, 3rd, 1st, 4th, 2nd, 1st, 3rd, 5th (slowest), 1st, 2nd, 3rd, 1st, 4th, 2nd, . . . (repeating).

Tri-peering

The essence of tri-peering is that for reasons of security and trust, certain transactions need to be managed or simply witnessed by a third party. The present embodiment supports two forms of tri-peering: witnessing (used for trades and swaps) and auctions.

Witnessing is executed as follows. The two (or more) peers that are about to enter into a "contract" independently contact the Transaction Manager (with the GIVEWITNESS command) citing themselves and the other party/ies to the transaction. The Transaction Manager replies with a transaction number and the details of a Witness(es) (obtained from the Login Super Peer with the GETSUPER command). At the same time, the Transaction Manager initiates the Witness(es) with a WITNESSTHEM command that lists the transaction number and the parties to the transaction.

Each party to the contract then sends a WITNESSTHIS command to the Witness(es) citing the transaction number and listing the details of the transaction (usually a textual agreement). If the Witness(es) receives a WITNESSTHIS message from every party to the transaction and has verified that the messages are identical, it acknowledges that the transaction has been witnessed. The details of the transaction are then stored permanently with the Witness(es) and with the Transaction Manager.

There are two types of auctions: open and closed. Both auctions are time limited. Auctions are "open" when everyone can see each bid as it is made and any individual peer can bid as many times as he wants. Auctions are "closed" when the value of the bids are hidden until the auction is over and any individual peer can only bid once.

Both open and closed auctions are initiated by the Transaction Creator with the CREATEAUCTION and JURYHIM commands. The first Super Peer to be a joint auctioneer is sent the first message. He (and any other peers already in the jury) then sends a JURYME message to add new jury members.

There are four steps for any individual peer to bid in an auction. First, he needs to know the details of the auction and (if the auction is open) the current highest bid. This information is sent by the Transaction Creator in response an AUCTIONTERMS message. The reply also includes a list of the details of all jury members.

Second, to place a bid the user sends an identical POST BID message to each jury member. Note: a less secure way to bid is to send a single POST BID message to the Transaction Creator, who then forwards it to each jury member. This alternative is of particular value to users interacting with The Co-operative via a web page.

Third, the jury members then use IRECEIVED messages between each other to verify that all have received the bid and then each acknowledges receipt. The present embodiment of the bidder must verify that an acknowledgement is received from each jury member.

Fourth, the jury members do not evaluate each bid as it is entered. Rather, that is the responsibility of the owner of the auction. The owner of the auction uses the GETBID command to get the current highest bid and the GETBIDS command to get the complete list of bids. For closed auctions, these two commands only work after the auction is closed.

It is the responsibility of the owner of the auction to evaluate the bids during the auction (if it is open) and after (whether it is open or closed) and to let bidders know who is ahead in the bidding (if it is open) and who has won (when it is finished).

Although the owner of the auction can disqualify the highest bid and accept a lower bid, all bidders are informed that this has been done and why. The second (and subsequent) bidders have the right to refuse to honour their bids if the highest bid is disqualified.

Note: After a trade has been completed, both parties to the exchange are asked (via a RATEHIM message from a Reconciler) to rate the other party on a scale of 1 to 5 in terms of their perceived integrity and how easy it is to do business with them. Without affecting a user's average rating, the fact the highest bid in an auction was disqualified is recorded against the user who was the owner of the auction (via a TAKENOTE message from the Reconciler to the Directory Peers).

Commands

As a general philosophy, all messages that make some change (rather than asking for information) define the change in absolute terms and not relative terms (i.e. they say that the new price is £10 instead of saying that it is £1 more than it was). This is important because it can not be guaranteed that any given message will be received only once.

All messages (except acknowledgements), regardless of whether they are duplicates or not, are acknowledged.

In the following list, the text of the command is in Courier New Font. Arguments for the command are enclosed in triangle brackets ('<' and '>'). Arguments beginning with an asterisk ('*') are optional. Every command sends a <timestamp> which is the date and time that the message was composed and the <host> and <port> of the sender. Acknowledgements are sent to this host and port.

The formatting of the host argument conforms to the Internet standard—four numbers valued from 0 to 255 separated by full stops ('.')—except that suffixes are allowed. If a suffix is included it must follow the host address and must be separated from the host address with a forward slash (for example, "255.255.255.255/Alpha" where "Alpha" is the text of the suffix). The text of the suffix is returned in the reply as the value of the <suffix> argument and is used primarily to implement client/server peering on servers where the instructions of sub-clients are consolidates such that the server logs into The Co-operative only once.

All commands that begin with POST are formatted such that they can sent either to the HTTP port or the port used by the present embodiment. This allows users running a web browser and not the present embodiment some access to the The Co-operative. The other three types of commands are sent only to the port used by the present embodiment.

FORWARD <SHOST> <SPORT> <T/RPASSWORD> <TIMESTAMP> <MESSAGE>—The sender of this message includes the transaction password or the receiver's login password (see below), and the sender's host and port to verify the sender's identify. If the password is valid then the receiver begins to process the <message> as if it had received it directly. If the password was a transaction password then the receiver confirms that the message only affects resources applicable to the associated task before it completes the processing.

PASSON <SHOST> <SPORT> <TIMESTAMP> <MESSAGE>—This command is very similar to the FORWARD command except that 1) this message is only accepted by a peer acting as a Messaging Super Peer, and 2) no password is required.

FORGETIT <SHOST> <SPORT> <*T/RPASSWORD> <TIMESTAMP> <MESSAGE>—This command cancels a previous FORWARDed message. The receiver's password/transaction password is optional. If it is included then this command is being sent by a joint sibling who had forwarded the message. If it is not included then it is being sent by a third-party who sent the message directly. So as to support this function, all changes to databases are timestamped and reversible. Additions can be deleted. Deletions are merely flags that say that certain data has been deleted (to be garbage collected two days later). Changes are implemented as a deletion and then an addition.

FORGETHIM <SHOST> <SPORT> <T/RPASSWORD> <THOST> <TPORT> <TIMESTAMP>—This command is sent by one joint/jury peering member to his joint/jury siblings, requesting that they drop a specific sibling from the joint/jury peering relationship. The authenticity of the message is confirm with the host and port of the sender and the receiver's or transaction password. Each sibling receiving this message then PINGs the supplied target host and port. If no PONG is received back then they drop the target sibling and wait for a new joint/jury member to be added doing nothing in the interim. If a PONG is received, they drop the target sibling and wait for a new joint/jury member to be added. Then they drop the sending sibling and request that a new joint/jury member be added (with the FORGETHIM, DEAD and JOINTME commands).

Note: If a peer receives a second FORGETHIM message soon after first receiving one and the second FORGETHIM lists the sender of the first message as the target in the second, then the regular PING/PONG step is ignored.

DROPHIM <SHOST> <SPORT> <RPASSWORD> <THOST> <TPORT> <TIMESTAMP>—This command is substantially similar to FORGETHIM except that it is sent by the Login Super Peer and it is implemented without further checking. Instead of passing the transaction password, the identity of the sender is confirm by the inclusion of the recipient's login password.

DEAD <SHOST> <SPORT> <*TASK> <THOST> <TPORT> <TIMESTAMP>—This command is sent to the Login Super Peer. The Login Super Peer acknowledges with the host and port of the next available Super Peer. The Login Super Peer then attempts to PING the target host and port once. If there is no reply within a suitable period, the target host and port are logged out. The <task> argument is optional. If it is supplied then the target host and port is replaced in the list of resource IPs with the newly supplied host and port, and the "next available" Super Peer is a sibling of the dead Super Peer for the task described.

Note: To doublecheck that the list of resource IPs is accurate, after a suitable wait, the Login Super Peer sends a WHOSIBLINGS message to each peer in the affected joint/jury peering relationship. If the replies and the list of resource IPs agree, then there is no problem. If the replies agree and the list of resource IPs does not, then the list of resource IPs is updated. If the replies do not agree, then the configuration in the resource IPs list is imposed with DROPHIM and JOINTHIM messages.

WHOSIBLINGS <SHOST> <SPORT> <*TASK> <TIMESTAMP>—This command forces the receiving peer to list all joint/jury siblings that is has for the listed task. If <task> is omitted, it lists its siblings for all tasks. The list is sent to the supplied host and port.

JOINTME <SHOST> <SPORT> <TASK> <T/RPASSWORD> <TIMESTAMP> <SHADOWS> <HOST1> <PORT1> . . . <*DATABASE1> . . . —This command requests that the receiver join a joint/jury peering set, operating with the attached database(s). The peering set is working on a specific <task> identified by a certain transaction password (<tpassword>). There are a certain number of siblings other than the sender (<shadows>) and their hosts and ports are listed.

Note: As part of implementing this command, the receiver sends a JOINTME message to the other siblings listed. Thus, if a peer receives a JOINTME to perform a task under a specific transaction password that the peer is already performing, then the list of siblings is updated and the message is acknowledged, but no further action is required.

JOINTHIM <SHOST> <SPORT> <TASK> <T/RPASSWORD> <TIMESTAMP> <SHADOWS> <HOST1> <PORT1> . . . —This command comes from the Transaction Creator or the Login Super Peer and forces the recipient to send a JOINTME to the target host and port.

PING <SHOST> <SPORT> <TIMESTAMP>—This command forces the recipient to send a PONG (in lieu of an acknowledgement) to the host and port.

PONG <SHOST> <SPORT> <TIMESTAMP>—This command requires no reply or acknowledgement.

YOUTRY <SHOST> <SPORT> <T/RPASSWORD> <TIMESTAMP> <ATTEMPTERS> <HOST1> <PORT1> <MESSAGE>—This command is substantially similar to the FORWARD command, except that the sender was unable to process the message and thus the receiver should try. If the receiver is unable to process the message, it should be forwarded (using YOUTRY) to another joint peer. The <attempters> argument says how many sibling peers (other than the sender) have already tried. The host and port of these siblings are listed before the text of the message. If every sibling has tried the message and none are able to process it, then a failure is sent to the sender of the original message. Whichever sibling is able to process the message sends an acknowledgement to the sender of the original message.

QUERY <SHOST> <SPORT> <T/RPASSWORD> <TIMESTAMP> <SQLQUERY>—This command allows one sibling peer to query the database of another sibling peer. If the receiver is unable to process the query then a error is returned to the sender. If the receiver is able to process the query then the acknowledgement includes the results.

Note: If a transaction password is used to verify the authenticity of the command, then the query is only processed if it relates to a database that relates to the transaction in question.

IRECEIVED <SHOST> <SPORT> <T/RPASSWORD> <TIMESTAMP> <MESSAGE>—This command is substantially similar to the FORWARD command, except in that the message itself is not processed. If a jury member receives a message from a third party and IRECEIVED messages from all its siblings confirming that they received the same message, then the jury member acknowledges receipt of and then processes the original message.

CANCEL <SHOST> <SPORT> <TIMESTAMP> <MESSAGE>—This command is used to cancel a message sent earlier to a jury. It is only necessary to cancel a message sent to a jury if all members of the jury received, acknowledged, and processed the original message, but came up with different results. Note: This command is substantially similar to FORGETIT.

LIAR <SHOST> <SPORT> <TIMESTAMP> <SMESSAGE> <EMESSAGE>—In addition to CANCELing a message that is misprocessed by a jury, the recipient of a false jury return is required to report it to the Login Super Peer. Included in the "accusation" is a copy of the suspect result (the <smessage>) and the expected result (the <emessage>). These two messages are not processed, but are stored to provide an audit trail should an investigation be required.

JURYHIM <SHOST> <SPORT> <TASK> <T/RPASSWORD> <SHADOWS> <TIMESTAMP> <HOST1> <PORT1> . . . <*DATABASE1> . . . —This command is substantially similar to the JOINTHIM command except that the siblings are to form a jury and not a joint peering.

JURYME <SHOST> <SPORT> <TASK> <T/RPASSWORD> <SHADOWS> <TIMESTAMP> <HOST1> <PORT1> . . . —This command is substantially similar to the JOINTME command except that the siblings are to form a jury and not a joint peering.

DISBAND <SHOST> <SPORT> <TASK> <TPASSWORD> <RPASSWORD> <TIMESTAMP>—This command is only used in the event of a catastrophic failure of a jury, such that only a disbanding of the jury and the discarding of its work is appropriate. Since this message will only come from the Login Super Peer, the identity of the sender is confirmed by the inclusion of the recipient's AND the transaction passwords. Upon receipt of this message, the recipient must message every peer who has ever contacted it about the task in question and notify them that the task has been aborted.

GETSUPER <SHOST> <SPORT> <TIMESTAMP> <*EXCLUSIONS> <*EHOST1> <*EPORT1>—This command forces the receiving peer (typically the Login Super Peer) to suggest the host and port of another Super Peer. Optionally this command can exclude certain Super Peers from consideration. The number of excluded Super Peers is provided with the host and port of each.

TRANSFER JURY <SHOST> <SPORT> <TASK> <T/RPASSWORD> <SHADOWS> <TIMESTAMP> <HOST1> <PORT1> . . . —This command is substantially similar to the JURYHIM command except that the sender stops performing the stated task once the new jurer has acknowledged receipt.

FORGETME <SHOST> <SPORT> <T/RPASSWORD> <TIMESTAMP>—This command is substantially similar to the FORGETHIM command except that 1) the peer to be forgotten is the sender, and 2) it is implemented without further checking.

LOADING <SHOST> <SPORT> <TIMESTAMP>—This command forces the recipient to assess its current loading. The acknowledgement includes a single number summarising this state.

GIVEWITNESS <SHOST> <SPORT> <TIMESTAMP> <*MEMBERS> <PARTIES> <HOST1> <PORT1> . . . —This command is used to initiate the creation of a witnessing. A peer requiring a witness messages the Transaction Manager citing his own host and port, the number of witnesses required (<members>), and the number of other parties and their hosts and ports. Once the Transaction Manager receives this information from all parties, the witnessing is created and the message acknowledged. Note: if the number of members is greater than 5, it is reduced to five. If the number of members is not supplied, it defaults to 1.

ACTIVATE WITNESS <SHOST> <SPORT> <TIMESTAMP> <TPASSWORD> <TNUMBER> <PARTIES> <PHOST1> <PPORT1> . . . —This command is sent by the Transaction Manager to one jury peer involved in the witnessing. The message includes the hosts and ports of all parties to the transaction that needs to be witnessed, and the proposed transaction number and password. No <type> argument is included as all witnessing are run as jury peerings. Subsequent jury members are joined with the JURYHIM command. As each jury member joins the jury, they acknowledges receipt to all of the parties with the WEWITNESS command.

WEWITNESS <SHOST> <SPORT> <TIMESTAMP> <TNUMBER> <SIBLINGS> <SHOST1> <SPORT1> . . . <PARTIES> <PHOST1> <PPORT1> . . . —This command is the acknowledgement sent by each member of the witnessing jury to each of the parties and witnesses to the transaction to be witnessed, and the transaction number.

WITNESSTHIS <SHOST> <SPORT> <TNUMBER> <TIMESTAMP> <MESSAGE>—This command is the header to the message that needs to be witnessed. This header includes the host and post of the source and the transaction number. If the witnesses receive identical <messages> as part of WITNESSTHIS messages from all the parties to the transaction, then the transaction is confirmed.

ACTIVATE AUCTION <SHOST> <SPORT> <TIMESTAMP> <TPASSWORD> <TNUMBER> <TERMS>—This command is sent by the Transaction Manager to one jury peer involved in an auction. The message includes the proposed transaction number and password. Subsequent jury members are joined with the JURYHIM command.

AUCTIONTERMS <SHOST> <SPORT> <TIMESTAMP> <TNUMBER>—This command forces the Transaction Manager to reply with the terms of the auction (i.e. what is being auctioned, when will the auction expire, whether it is open or closed, what is the current highest bid) and the complete list of jury auctioneers.

POST BID <>—<SHOST> <SPORT> <TIMESTAMP> <TNUMBER> <BID>—This command is sent to each auctioneer to submit a bid.

GETBID <SHOST> <SPORT> <TIMESTAMP> <TNUMBER>—This command forces an auctioneer to reply with the current highest bid in the given auction. This command results in an error if the auction is closed.

GETBIDS <SHOST> <SPORT> <TIMESTAMP> <TNUMBER>—This command forces an auctioneer to reply with the complete list of bids in the given auction. This command results in an error if the auction is closed.

GETKEY <SHOST> <SPORT> <TIMESTAMP> <*THOST> <*TPORT>—This command forces the recipient to reply with their public key. If the optional target host and port are not supplied, it forces the recipient to reveal what it thinks is the public key of the target. If the recipient does not know the public key, an error is sent.

REGISTERKEY <SHOST> <SPORT> <SPASSWORD> <TIMESTAMP>—This command is used by a peer to register a new public key with the Login Super Peer.

Command Security

Many of the above listed commands are extremely powerful. A malicious individual could use such commands to disrupt fundamentally the provision of various services or even to falsify transactions and cheat in auctions. Security is thus vital. Three principle methods are used to ensure that commands are authorised: digital signatures, a hierarchy of passwords, and encryption.

Every peer which intends to access The Co-operative is required to generate a new 1024-bit public key/private key pair using DSA protocols each time they log in. All peers are required to replace their public/private key pairs at least every 72 hours. When any peer logs into The Co-operative, via one of the Login Super Peers, it supplies both its password (which typically had been registered previously) and its current public key.

All the above command messages (other than those that are purely informational—e.g. WHOSIBLINGS, PING, PONG, GETSUPER, LOADING, AUCTIONTERMS, GETBID, GETBIDS, GETKEY) are digitally signed.

In any situation where a certain message is authorised only if it comes from certain known peers (e.g. the receiving peer's joint/jury siblings) then the digital signature should be sufficient. Sometimes, however, an authorised message might come from a peer that had not previously been known. For example, the members of an auction jury may be contacted by a joint Transaction Creator peer different than the one who initiated the auction jury.

Rather than having the joint Transaction Creator peers share the same public/private keys, a hierarchy of passwords is also used. Each parent peer (except the Login Super Peers) to any given task (see the next section) holds a unique password for that task that is known only to the parent and the siblings. For example, when a Transaction Creator initiates a new auction and sets up a new auction jury, a random transaction password is generated and stored in local databases. In addition to being digitally signed then, any message that is only authorised if it comes from a parent or sibling also carries the relevant transaction password.

Note: Certain joint/jury peering arrangements are not set up for the purpose of providing specific central services. These relationships are implemented with cross log ins. For example, a given user may be logged into The Co-operative via both his PC at home and his mobile phone. In order to establish a joint peering relationship between the two, they must log into each other. For this type of joint/jury peering relationship, the recipient's login password is sent with each message.

In the above commands, three passwords are used. <Spassword> is the sender's login password, used when the sending peer logged into The Co-operative. Generally this password is only sent to a Login Super Peer or a Reconciler. <Rpassword> is the receiver's password, which is only known to the Login Super Peers. <R/Tpassword> is either the receiver's password or the transaction password of a specific transaction, depending on how the joint/jury peering relationship was established.

Note: Any message containing a password as an argument is encrypted (either with the receiver's or the sender's key). LOGIN (see below) is a special case. The sending peer first logs in as "anonymous" (without a password and thus unencrypted) to get the receiving peer's public key in reply (amongst other things). The sending peer then uses this public key to encypt a normal login.

"Back Office" Functionality

Every peer has the software code necessary to send and to process all the above commands, which are required to implement co-operative peering. As far as is reasonably possible, all peers have the exact same software code. Every peer also has software code to implement a number of other functions, which are required to operate the present embodiment. The functions and relevant commands are as follows:

give users the address of a Categories Guide (2), a Chat Room Guide (3), a Notice Board Guide (4), a Message Super Peer (5), a Directory Super Peer (6), and a Transaction Creator (7). The Categories Guide (2) provides a list of valid categories and their Item Title Guides (8), who in turn provide lists of item titles and the Demand Holders (9) and Database Holders (10) for each. The Chat Room Guide (3) provides a list of active chat rooms and the Moderators (11) of each. The Notice Board Guide (4) provides a list of active notice boards and the Moderators (12) of each. The Directory Peers (6) give users the address of the Email Forwarding Peer (13). The Transaction Creator (7) nominates Auctioneers (14) and Witnesses (15) as required and gives users the address of a Reconciler (16).

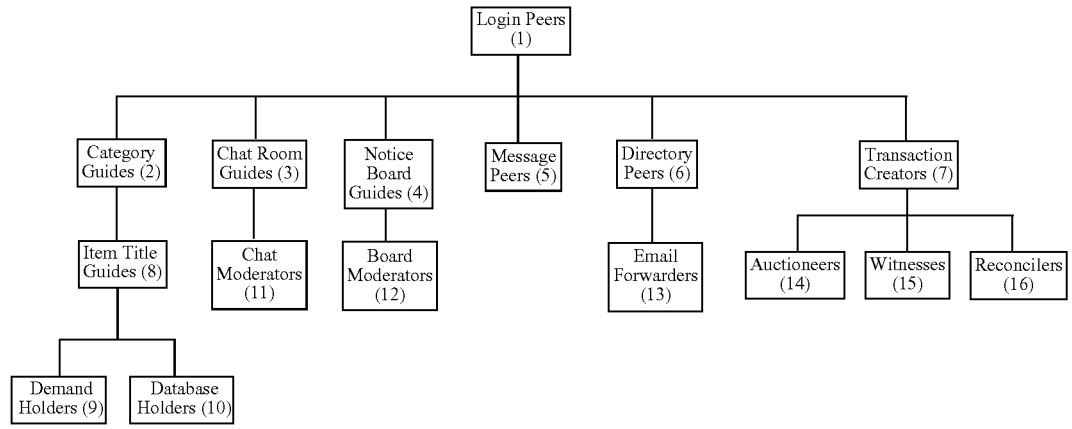

| Task | Type of Super Peer | Type of Peering | No of Shadows |
|---|---|---|---|
| 1a. managing logging in and maintaining the "who's online" list | secure | joint | 5 |
| 1b. assigning tasks to Super Peers and directing peers to the right Super Peers | secure | joint | 5 |
| 2. maintaining the valid categories list | regular | joint | 5 |
| 3. maintaining the chat room list | secure | joint | 3 |
| 4. maintaining the notice board list | secure | joint | 3 |
| 5. passing on undelivered messages | secure | joint | 5 |
| 6. maintaining stored users details - e.g. emails, geographic location | secure | joint | 5 |
| 7. assigning auction and transaction tasks to Super Peers | secure | joint | 5 |
| 8. maintaining a valid item titles list | regular | joint | 5 |
| 9. maintaining a demands list | secure | joint | 5 |
| 10. maintaining the book values list (and other information - e.g. images) | regular | joint | 3 |
| 11. maintaining a chat attendee list | regular | joint | 3 |
| 12. managing a notice board | regular | joint | 3 |
| 13. managing part obscured emails | secure | jury | 3 |
| 14. managing an auction | secure | jury | 5 |
| 15. managing a transaction | secure | jury | 5 |
| 16. reconciling transaction | secure | jury | 5 |

Peers find one of the Super Peers operating these tasks by following a hierarchy as follows: The Login Super Peer (1)

The functions and commands necessary to execute these tasks follow:

Login Super Peer (1a)

Any peer can act as a Login Super Peer, establishing their own co-operative. In practical terms, however, there is only one Co-operative because the software of the present embodiment is distributed with the host and port of the "official" Login Super Peers already defined and it is to everyone's advantage for there to be a single co-operative instead of multiple ones. The following functionality is supplied to all peers, however, to facilitate joint/jury peering.

Logging in is handled with the LOGIN and LOGOUT commands respectively. Registration of a new username and password to be used for future logins is handled with the TRYLOGIN command. Note: TRYLOGIN is not a security risk because a peer only accepts invasive commands from the peer that it is logged into, NOT from peers that are logged into it.

LOGIN <susername> <*spassword> <host> <port> <public key> <timestamp> <*superpeer> <*certificates>— This command logs the sending peer into the receiving peer, thus adding them to the receiver's local "who's online" list. If the receiving peer is a Login Super Peer the result is that the sending peer becomes part of The Co-operative.

The <susername> and <spassword> arguments are of the sending peer (note: the user must have been registered previously). The <spassword> argument is optional only when <susername> is set to "anonymous". The <host> and <port> arguments define the socket through which the sending peer expects a reply. The <public key> of the sending peer is necessary for encryption. The <superpeer> arguments flags whether this user intends to be logged in permanently—and is thus available to be a Super Peer. The <certificates> arguments lists the certificates held by the sending peer. These are necessary to become a Secure Super Peer.

Upon receiving this command, the receiving peer compares the <susername> and <spassword> against its register of valid users (unless the <susername> is "anonymous"). The receiving peer then adds the attached details to its local "who's online" list and then replies with its (the receiving peers') public key and its list of resource IPs (discussed in greater depth later).

Note: Logging in "anonymous" results in no registration in the "who's online" list, but it does force the receiving peer to transmit its public key and its list of resource IPs. In this way, a user can access parts of The Co-operative without being registered as being online.

LOGOFF <susername> <spassword> <*host> <*port> <timestamp>—This command logs the sending peer off the receiving peer, thus removing them from the local "who's online" list. The <host> and <port> are optional as the acknowledgement will be sent to the previously recorded host and port if these arguments are not supplied.

TRYLOGIN <susername> <spassword> <host> <port> <public key> <timestamp> <*superpeer> <*certificates>— This command is similar to LOGIN except that it attempts to create a new registration for the sending peer before attempting to log in the sending peer. The first step by the receiver is to verify that that <username> is not already in use (note that usernames are case insensitive).

Network Guide (1b)

A second task of the Login Super Peer is to set up the hierarchy of services that comprise The Co-operative. Key to this task are the ACTIVATE, DEACTIVATE, and TRANSFER commands. A range of other commands (listed in the previous section) are also used by the Network Guide.

As with the functions of the Login Super Peer, any peer can act as a Network Guide, establishing their own co-operative. Doing so, however, is not particularly useful. With that said, small groups of individuals might want to set up chat rooms and notice boards that are not accessible by the general population. One way to do this would be to use the following commands to initiate these services independently.

ACTIVATE <task> <host> <port> <timestamp> <tpassword> <*rpassword>—This command requests that the receiving peer begin performing a particular <task> (catguide, itemguide, demands, bookvalues, chatmngr, chatroom, boardmngr, boardroom, messaging, directory, email, transacts, auction, witness, reconcil). The first step is to register the supplied <host> and <port> as the parent for the listed task. Having a parent for a particular task triggers the initiation sequence for that task. An acknowledgement is sent to the supplied <host> and <port>. ACTIVATE WITNESS and ACTIVATE AUCTION commands are subcases of this command.

The receiver's password is included as an argument for certain tasks (demands, messaging, transacts, and reconcil) so as to verify that this request came from a peer with whom the receiver is logged in. The transaction password is stored and is used to verify that future commands have come from the parent or siblings.

DEACTIVATE <task> <host> <port> <tpassword> <timestamp>—This command requests that the receiving peer stop performing a particular <task>. The transaction password is included to verify that this request came from the peer (or one of his joints) who originally activated the task. An acknowledgement is sent to the supplied <host> and <port>. This command is used if the task to be ended has been completed. If the task has not been completed, the DISBAND command is used.

DISBAND <shost> <sport> <task> <tpassword> <rpassword> <timestamp>

FORGETHIM <shost> <sport> <t/rpassword> <thost> <tport> <timestamp>

DROPHIM <shost> <sport> <rpassword> <thost> <tport> <timestamp>

FORGETME <shost> <sport> <t/rpassword> <timestamp>

JOINTHIM <shost> <sport> <task> <t/rpassword> <shadows> <timestamp> <host1> <port1> . . .

JURYHIM <shost> <sport> <task> <t/rpassword> <shadows> <timestamp> <host1> <port1> . . .

TRANSFER JURY <shost> <sport> <task> <t/rpassword> <shadows> <timestamp> <host1> <port1> . . . <*database1> . . .

TRANSFER <type> <shost> <sport> <task> <t/rpassword> <shadows> <timestamp> <host1> <port1> . . . <*database1> . . .—This command requests that the receiving peer establish a shadow partnership to perform a particular task. The <type> argument says whether the shadows are to be joint peers or jury peers. The <task> argument is the same as the activate command. The <shadows> argument lists the number of shadows that are to be created. Following the <timestamp>, hosts and ports are supplied for each shadow. The optional <database> arguments are the databases underlying the performance of the <task>.

When receiving this command, the receiver sends JOINTME or JURYME commands to the peers on the list. An acknowledgement is sent to the supplied <host> and <port>.

FREEME <shost> <sport> <*task> <spassword> <timestamp>—This command is sent to the Login Super Peer requesting that the sender be freed from performing some or all the central server tasks currently assigned to it. If the <task> argument is not supplied then the sender is to be freed of all tasks. When a Login Super Peer receives this message, selects a replacement Super Peer(s) and then sends a SWAPHIM command to all relevant Super Peers.

SWAPHIM <shost> <sport> <rpassword> <thost> <tport> <rhost> <rport> <timestamp>—This command is substantially similar to the DROPHIM command except that the host and port of a replacement is sent as well.

DEAD <shost> <sport> <*task> <thost> <tport> <timestamp>

PING <shost> <sport> <timestamp>

PONG <shost> <sport> <timestamp>

GETSUPER <shost> <sport> <timestamp> <*exclusions> <ehost1> <eport1> . . .

GETKEY <shost> <sport> <timestamp> <*thost> <*tport>

Category Guide (2), Chat Room Guide (3), Notice Board Guide (4), and Item Title Guide (8)

One flaw with a true peer-to-peer system is that there is no way to ensure that a broadcast by one peer will be heard by every other peer. This is the case because there is no central register of peers and "passing messages down the grape vine" (especially when the number of "passes" is restricted to seven as it is understood is the case with Gnutella) is not guaranteed to reach every peer.

The present embodiment overcomes this limitation by maintaining central registers of peers and services. The following commands are used to create such registers. Each of these commands has one of four variants corresponding to registers of categories (e.g. "comics vs coin"), registers of chat rooms, registers of notice boards, and registers of items (e.g. "US pennies vs South African Krugerrands").

As stated before, these services are available to be executed by any peer, although they are intended for use by the official designates of The Co-operative.

GET <items> <host> <port> <timestamp>—The <items> argument can be CATS, ROOMS, BOARDS, or ITEMS. This command forces the receiver to send to the supplied host and port the list of valid <items>, associated <items> numbers, and the host and port of the relevant guides, holders, or moderators.

GET <item> <itemname> <host> <port> <timestamp>—The <item> argument can be CAT, ROOM, BOARD, or ITEM. This command forces the receiver to send to the supplied host and port the <item> number and the host and port of the guide, holders, or moderator relevant to the supplied <itemname>.

GET <item> <itemno> <host> <port> <timestamp>—The <item> argument can be CATNO, ROOMNO, BOARDNO, or ITEMNO. This command forces the receiver to send to the supplied host and port the <item> name and the host and port of the guide, holders, or moderator relevant to the supplied <itemno>.

PUT <item> <itemname> <host> <port> <tpassword> <*host1> <*port1> <*host2> <*port2> <timestamp>—The <item> argument can be CAT, ROOM, BOARD, or ITEM. This command forces the receiver to add the attached <itemname> (and host and port of the associated guide, holders, or moderator, if supplied) to its list. The transaction password is included to confirm that this request has come from an authorised source. The receiver replies with the associated <item> number and activates a guide, holders, or a moderator for the entry.

DELETE <item> <itemno> <host> <port> <tpassword> <timestamp>—The <item> argument can be CAT, ROOM, BOARD, or ITEM. This command forces the receiver to delete the attached <itemno>.

Message Peer (5)

The sole purpose of the Message Peer is to pass on messages to peers who logged off or otherwise were not able to receive them. There are only two command. If a peer attempts to send a message three times and never receives an acknowledgement, then it passes it to a Message Peer to be delivered the next time that the intended recipient comes online.

PASSON <shost> <sport> <timestamp> <message>

NOWONLINE <host> <port> <spassword> <timestamp>—This command is sent by a peer to the Message Peer to notify that it is now online.

Upon receiving the NOWONLINE command, the Message Peer will attempt to deliver any messages pending for the included host and port. The sender's password is required to ensure that only the intended recipient is able to retrieve his own messages.

Directory Peer (6)

The Directory Peer holds public information about each peer. Normally if Peer1 is interested in certain details about Peer2, it would simply ask directly. If Peer2 is not online, however, Peer1 will ask the Directory Peer.

As with all the other commands listed above, any peer could behave as a Directory Peer if it so wanted. The advantage of using the "official" Directory Peer is that its host and port are known (or can be found out). The host and port of another peer acting as a Directory Peer may be more difficult to determine.

GETSOCKET <shost> <sport> <timestamp> <*thost> <*tport>—This command forces the recipient to send all known public details of the target host and port. If the optional target host and port is not supplied, it forces the recipient to reveal what it knows about the sender.

GETUSER <shost> <sport> <timestamp> <username>—This command is substantially similar to GETSOCKET except that it forces the recipient to send all known public details of the target username.

POST USER <shost> <sport> <timestamp> <username> <spassword> <*email> <*location> <*homepage> . . . —This command is sent to the Directory Peer to update the data stored on a particular username. For reasons of security, the login password of the user must be supplied. Note: The Directory Peers and the Login Peers are in a joint peering relationship and thus the Directory Peers are able to use the QUERY command to verify the supplied password.

The optional data that is typically supplied is the user's email address, geographic location, and homepage URL. Any data can be supplied with the POST USER command. Whatever is supplied will be stored. Whatever is stored will be returned with the GETSOCKET and GETUSER commands.

LOGIN ANONYMOUS <host> <port> <public key> <timestamp>—This command forces the receiver to return its own public key and its list of Resource IPs—in the case of the Directory Peer, this additionally includes an Email Forwarders.

Transaction Creator (7)

The Transaction Creator is the "neutral" Super Peer that strangers can go to to have a witnessing or an auction set up. The relevant commands can be used by anyone to set up a witnessing or an auction, but such "officials" in such situations are not guaranteed to be unbiased.

The commands accepted by the Transaction Creator are as follows. The commands used by the Transaction Creator were listed above.

ACTIVATE WITNESS <shost> <sport> <timestamp> <tpassword> <tnumber> <parties> <phost1> <ports1> . . .

ACTIVATE AUCTION <shost> <sport> <timestamp> <tpassword> <tnumber> <terms>

AUCTIONTERMS <shost> <sport> <timestamp> <tnumber>

Demand Holder (9) and Database Holder (10)

To some extent, the main purpose of The Co-operative is to remember current demand so that all peers (both those currently online and those currently offline) are able to compare their "stock" with current demand. The Co-operative is organised such that a specific Super Peer acts as the Demand Holder for a particular item (e.g. "Iron Man comics"). Every peer must be able to find this specific peer(s) so that it can register new demand and so that it can get a listing of current demand to be compare against its "stock". The hierarchy as described above ensures that every peer logged into The Co-operative is able to find these peers.

The following commands then are those relevant to the Demand Holders to capture and disseminate demand. These commands are also relevant to the Database Holders (which are, in some senses, a special case of the Demand Holders), which holds the "official" book price for an item and assorted other information.

1GETITEM <item> <itemname> <shost> <sport> <timestamp>—The <item> argument can be DEMANDS or DETAILS. This command forces the recipient to send all known demands or details relating to the supplied <itemname> (e.g. "Iron Man comics").

GETITEMNO <item> <itemno> <shost> <sport> <timestamp>—The <item> argument can be DEMANDS or DETAILS. This command forces the recipient to send all known demands or details relating to the supplied <itemno> (e.g. "17" meaning "Iron Man comics").

POST DEMAND <shost> <sport> <timestamp> <itemname> <version> <condition> <offertype> <susername> <dpassword>—This command is sent to the Demand Holder to create a new demand for the listed item name (e.g. "Iron Man comics"). A new demand requires the version (e.g. "4" as in "Iron Man 4") and the condition of the item (e.g. "1" meaning "mint condition"), the nature of the offer, the username of the demander, and a unique password for the new record. The acknowledgement includes the demand number.

POST DETAIL <shost> <sport> <timestamp> <itemname> <version> <condition> <bookvalue> <tpassword> <*data>—This command is sent to the Database Holder to update the record for a particular item. For reasons of security, the transaction password is required. Specifically, this command associates a <bookvalue> (and optionally other <data>), to an <itemname>, <version>, and <condition>. No identifying number is supplied in the acknowledgement as there is only one book value. When a new book value is stored, the previous book value is deleted.

DELETE DEMAND <itemno> <demandno> <shost> <sport> <timestamp> <*tpassword> <*dpassword>—This command is sent to the Demand Holder to delete the attached <demandno> associated with the attached <itemno>. For reasons of security, either the transaction password or the demand password is required.

Note: You can not delete a detail record.

Chat Moderator (11)

The Chat Room Moderator maintains the list of people currently in a named chat room. In addition to being activated and deactivated, the moderator maintains the list of room occupants. The moderator does not receive or otherwise interact with any message public or private associated with the room.

ACTIVATE CHATROOM <host> <port> <timestamp> <tpassword> <roomtitle>—This variant of the ACTIVATE command creates a chatroom moderator. In addition to supplying the host and port of the parent, this message contains a transaction password and the title of the room.

DEACTIVATE CHATROOM <host> <port> <tpassword> <timestamp> <*roomtitle>—This command requests that the receiving peer stop moderating either the named chat room or all chat rooms that it is moderating, depending on if the optional <roomtitle> is supplied.

ENTERROOM <host> <port> <timestamp> <ipassword> <*roomtitle>—This command adds the listed host and port as a room occupant. The sender includes a password to be used to leave the room. The acknowledgement includes a list of the current occupants of the room (including the host and port just added).

LEAVEROOM <host> <port> <timestamp> <ipassword> <*roomtitle>—This command removes the listed host and port as a room occupant.

LISTROOM <host> <port> <timestamp> <*roomtitle>—This command lists the current occupants of the room.

WHOYOU <shost> <sport> <timestamp> <*thost> <*tport>—This command forces the recipient to give details of themselves (via the WHOME command). If the optional target <host> and <port> are supplied, it forces the recipient to give details of the targeted peer.

WHOME <shost> <sport> <timestamp> <*host> <*port> <*username> <*rooms> <*size> <*location> <*describe> <*email>—This command covers a message listing the various public attributes of a peer, potentially including: its host and port, username, a list of the chat rooms it is in, the number of items in its collection, its geographic location, a one-line textual description, and its email address.

Note: Email addresses that end with " . . . " can only be used via the Email Forwarder Peer.

Notice Board Moderator (12)

Although superficially similar, notice boards and chat rooms are fundamentally different. Chat Room Moderators only maintain the list of people in the room. The people in the room handle their own messaging. Notice Board Moderators only maintain the list of messages. Active participants have no way of knowing who is currently receiving messages.

ACTIVATE BOARDROOM <host> <port> <timestamp> <tpassword> <boardtitle>—This variant of the ACTIVATE command creates a notice board moderator. In addition to supplying the host and port of the parent, this message contains a transaction password and the title of the notice board.

DEACTIVATE BOARDROOM <host> <port> <tpassword> <timestamp> <*boardtitle>—This command requests that the receiving peer stop moderating either the named notice board or all notice boards that it is moderating, depending on if the optional <boardtitle> is supplied.

POST BOARD <host> <port> <timestamp> <title> <body> <ipassword> <*boardtitle>—This command adds a new posting comprising a <title> and <body> to the notice board. The sender includes a password to be used to delete the posting later. The acknowledgement includes a number for the listing.

DELETEBOARD <host> <port> <timestamp> <postno> <ipassword> <boardtitle>—This command removes the posting associated with the <postno> from the notice board entitled <boardtitle>.

LISTBOARD <host> <port> <timestamp> <*boardtitle>—This command lists the titles (and associated posting numbers) of all postings to the optionally named notice board.

LISTMESSAGE <host> <port> <timestamp> <boardtitle> <postno>—This command lists the body text of a specific postings to a named notice board.

Email Forwarder (13)

The sole purpose of the Email Forwarder is to email messages to peers who want their email address partially obscured. There is one command.

EMAIL <shost> <sport> <*username> <*thost> <*tport> <timestamp> <message>—This command is sent to the Email Forwarder for it to email the attached message to a specific peer, identified either by <username>, or <host> and <port>. The Email Forwarder returns an error if it is unable to fulfil this request because the email address of the specified peer is unknown.

Auctioneers (14) and Witnesses (15)

The functions of the auctioneers and witnesses and the commands required to perform their tasks were described previously.

Reconciler (16)

The Reconciler is the key bridge between the virtual and the physical worlds, ensuring that what is agreed in the virtual world comes to be in the physical world. As such, the Reconciler has six primary functions: 1) to extract the salient elements of every exchange (i.e. what is being exchanged for what, by whom, how, and when); 2) to identify and bill for the various central services that facilitated the exchange; 3) to handle the escrow aspects of every potential and actual exchange; 4) to execute the virtual aspects of every exchange (e.g. the electronic transfer of money); 5) to track progress on the non-virtual aspects of every exchange; and 6) to update peers as to the progress being made.

To be able to perform its function, the Reconciler must have direct read access to the databases underlying each of the other central services. As such, each Reconciler is cross logged into the Login Super Peers, is thus able to extract the complete list of passwords, and is thus able to extract relevant data from any peer that is logged into The Co-operative.

Only five commands are required for the Reconciler to fulfil its role. There are a range of other functions (e.g. processing credit card transactions, handling escrows, setting charges, exempting transactions and/or users from charges, etc) that are required but are implemented in the user interface and not via command messages.

DONE <event> <host> <port> <timestamp> <tnumber>—The <event> argument can be either "auction" or "witness". This command is used to notify the Reconciler that an auction or witnessing has been completed. The Reconciler then uses the QUERY command to extract the relevant details.

QUERY <shost> <sport> <*tpassword> <*rpassword> <timestamp> <sqlquery>

STATUS <event> <host> <port> <timestamp> <*tnumber> <*username> <*password>—The <event> argument can be either "transact" or "user". This command forces the Reconciler to summarise the status of a particular transaction or all transactions affecting a particular user (note: the users password must be provided to authorise this).

It is anticipated that the operators of The Co-operative will impose the following example charges: a 10% buyer's premium on all auctions (i.e. the buyer is charged 10% more than the final bid price), a 10% seller's commission on all auctions (i.e. the seller is paid 10% less than the final bid price), a witnessing fee of 20 pence or 1% of the total transaction value (whichever is more) from all parties to the agreement, a 3% mark-up on all transactions involving credit cards, and a 10% mark-up on all distribution costs if distribution is handled by the operators.

Providing an escrow service for money and physical goods, certifying the condition of goods in escrow, listing demand, providing book values and other details, operating the chat rooms and notice boards, passing on messages, and maintaining a central record of user details (for when they are offline) will be handled initially without charge.

The Reconciler has the secondary task of triggering the rating of users after an exchange has been completed. Users are asked to rate the other party in an exchange on a scale from 1 to 5 in terms of the perceived integrity of the other party and how easy it is to do business with them. Four commands are of relevance.

RATEHIM <host> <port> <timestamp> <tnumber> <tusername> <thost> <tport>—This command triggers the receiving peer to query its user to rate the other party in a transaction. The other party is identified by the supplied username, host, and port. The transaction is identified by the supplied transaction number. The rating is sent directly to a Directory Peer, citing the transaction number. The Directory Peer then contacts the Reconciler to verify that a rating should be accepted from the relevant peer regarding the listed transaction.

IVERATED <shost> <sport> <timestamp> <tnumber> <tusername> <thost> <tport> <rating>—This command is sent by a peer to a Directory Peer to rate another user. Upon receiving this message, the Directory Peer verifies with a Reconciler that the rating should be accepted.

HERATED <shost> <sport> <timestamp> <host1> <port2> <tnumber> <tusername> <thost> <tport>—This command is sent by a Directory Peer to a Reconciler to verify that a rating received from one peer about another peer in relation to a specific transaction should be accepted. The acknowledgement by the Reconciler includes either "accept" or "decline".

TAKENOTE <shost> <sport> <rpassword> <timestamp> <tnumber> <tusername> <thost> <tport> <reason>—This command is sent by a Reconciler to a Directory Peer to make a note in the public record about a specific peer (identified by username, host, and port). This message carries the receiver's password to verify its authenticity. The <reason> argument contains the text of the note to be added to the public record.

"Who's Online" List and the List of Resource IPs

Every peer maintains three main lists of other peers: a list of who has logged into them and who is registered to log in, a list of who they have logged into or are registered to log into, and a list of the resources at their disposal.

The first two lists comprise: the relevant username, host, port, and password, and a flag (actually a timestamp) to indicate whether the peer is logged in. If no timestamp is supplied, then the user is not logged in; if a timestamp is supplied, then that is when the user logged in. The "who's online" list (referred to elsewhere in this document) is actually just the subset of the first list that comprises just those peers who are flagged as being logged in.

The third list contains all resources at the peer's disposal. The list includes at least one line for each task (login, catguide, itemguide, demands, bookvalues, chatmngr, chatroom, boardmngr, boardroom, messaging, directory, email, transacts, auction, witness, and reconcil) and for the parent of each task (signified with a prefixed plus sign). Each line comprises the role, username, host, port, whether HTTP commands are accepted, the password used to log in, the timestamped flag as to whether they are logged in, and their public key. The table is in the following format:

| Role | Username | Host | Port | HTTP | Password | LoggedIn? | PublicKey |
|---|---|---|---|---|---|---|---|
| login | root1 | 66.14.254.5 | 4555 | N | Gr8tness | 21/10/2000 13:14 GMT | EE146842... |
| login | root2 | 203.172.147.49 | 4555 | Y | NekoChia | | |

-continued

| Role | Username | Host | Port | HTTP | Password | LoggedIn? | PublicKey |
|---|---|---|---|---|---|---|---|
| login | root3 | 63.228.203.168 | 4555 | Y | Williams | | |
| cat | | 59.219.128.168 | 4555 | N | | | |
| +cat | | | | | | | |

Note:
The existence of a parent, triggers an initiation of that task.

"Back Office" Implementation

The present embodiment is written in Java. Java was selected because it is platform independent, is object oriented, and has built in (in object classes) much of the core functionality required by the present embodiment: manipulation of the graphical user interface, event handling, file and other input/output manipulation, networking and management of ports and sockets, security and encryption, etc.

As a general rule, the present embodiment communicates on its own port (hereafter referred to arbitrarily as Port 4555). This is particularly true of all communication between peers that does not involve Super Peers.

Depending on which Super Peers are assigned to these tasks, certain messages to Super Peers (e.g. the registration of new categories, item titles, demands, and stored user details; and requesting the current demand list for a specific item title, the book values relevant to an item title, the attendee list for a chat room, the heading list for a notice board, and the content of a notice) may be passed via the HTTP port using POST protocols. The use of POST protocols on the HTTP port allows users who are running standard web browsers (and not the present embodiment itself) to contribute to and interact with The Co-operative in limited ways.

All messages using HTTP POST protocols include in the body of the request the port that the reply should be sent to. So as not to violate the HTTP protocol, POST requests that direct the reply to the port of the present embodiment also trigger a stub reply to the HTTP port, one which merely acknowledges receipt of the request of the present embodiment and transmission of the response.

To demonstrate how these protocols and messages are used, the registration and logging in functions are considered in depth.

Registration

When the present embodiment is first downloaded and then run, the user is asked to log into The Co-operative. The IP addresses of the Login Super Peers are downloaded with the present embodiment and automatically updated each time the user connects to The Co-operative. To log into The Co-operative, the local application sends the following message to the port of the present embodiment (hereafter referred to as Port 4555) of one of the Login Super Peers:
LOGIN RAEKANET/1.0 257

USER: anonymous
HOST: 119.254.17.185:4555
KEY: 4A91EBA3 205EC352 C83B91C6 3361E22B 585993BF E94F68E5 75B658DA BDC19EC1 C274964F D8C33B4D 7D2C97A4 3BBA483D 6521461B 2A5DB166 DD9ED635 5C37C68A
DATE: Monday, 23-Oct-00 23:32:41 GMT Where the command is "login", the number of bytes sent is "257", the user name is "anonymous", the public key is generated at random and is as listed, and the software of the present embodiment will be expecting a reply on host 119.254.17.185/port 4555.

Note: Any message containing any password is encrypted before being sent. One advantage of the "anonymous" login is that it can be enacted without encryption because no password is ever sent.

The Login Super Peer replies with the following message to acknowledge that it has established a socket connection with the peer:
RAEKANET/1.0/login OK 407
DATE: Monday, 23-Oct-00 23:33:00 GMT
USER: Andrew67
HOST: 66.14.254.5:4555
KEY: EE146842 14A1CD94 BBAB9E2D 391CE748 7D5A9ED7 7D84DC74 2BED8968 AAC42B9C 1 05242E33 EDB72338 9C21A871 52CF637C 73C1B9FD B296F543 C72BE669 DD29C33C
1CAT: 59.219.128.168:4555
CHAT: 203.172.147.49:4555H
BOARD: 252.129.206.126:4555H
MSG: 158.80.19.190:4555
DIR: 63.228.203.168:4555H
TRANS: 20.4.35.211:4555H Where the "/login OK" acknowledges that "Andrew67" received and processed the login message, its public key is as shown, and it is expecting further replies on host 66.14.254.5/port 4555. The other host/port pairs are respectively the addresses of one each of the joint Categories Guides, joint Chat Room Guides, joint Notice Board Guides, joint Message Super Peers, joint Directory Super Peers, and joint Transaction Creators. The "H" after some of the port numbers means that that host accepts relevant requests via HTTP. These host, port, and http details are stored locally in the "list of Resource IPs" (as shown above).

| Role | Username | Host | Port | HTTP | Password | LoggedIn? | PublicKey |
|---|---|---|---|---|---|---|---|
| login | andrew67 | 66.14.254.5 | 4555 | N | Gr8tness | | EE146842... |
| login | root2 | 203.172.147.49 | 4555 | Y | NekoChia | | |
| login | root3 | 63.228.203.168 | 4555 | Y | Williams | | |
| cat | | 59.219.128.168 | 4555 | N | | | |
| chat | | 203.172.147.49 | 4555 | Y | | | |
| board | | 252.129.206.126 | 4555 | Y | | | |
| msg | | 158.80.19.190 | 4555 | N | | | |

-continued

| Role | Username | Host | Port | HTTP | Password | LoggedIn? | PublicKey |
|------|----------|------|------|------|----------|-----------|-----------|
| dir  |          | 63.228.203.168 | 4555 | Y |  |  |  |
| trans |         | 29.4.35.211 | 4555 | Y |  |  |  |

Note:
The host and port in the first three rows are downloaded with the software and are stored on the local hard drive (although they can be updated). The passwords for these lines are retained from previous registrations (see below). The others rows are discarded when the user logs off from The Co-operative.

The user is then asked by the present embodiment running locally to suggest a login name and password. This is the name that the user will be known by henceforth throughout The Co-operative. If the user wants the login name "TimeLord" and the login password "doctor7", a request is encrypted and transmitted. The unencrypted request is as follows:
TRYLOGIN RAEKANET/1.0 272
USER: TimeLord
PSWD: doctor7
HOST: 119.254.17.185:4555
KEY: 4A91EBA3 205EC352 C83B91C6 3361E22B 585993BF E94F68E5 75B658DA BDC19EC1 C274964F D8C33B4D 7D2C97A4 3BBA483D 6521461B 2A5DB166 DD9ED635 5C37C68A
DATE: Monday, 23-Oct-00 23:33:19 GMT If the proposed login name is not taken (and login names are case insensitive), then the Login Super Peer registers the username, password, host IP address, and public key; adds the username to its "Who's Online" database (i.e. puts a timestamp in the LoggedIn? column to flag that they are logged in); and then replies with the following message:
RAEKANET/1.0/trylogin OK 69
DATE: Monday, 23-Oct-00 23:33:00 GMT
USER: Andrew67
HOST: 66.14.254.5:4555

If the proposed login name is taken, the Login Super Peer replies as follows:
RAEKANET/1.0/trylogin FAIL 71
DATE: Monday, 23-Oct-00 23:33:00 GMT
USER: Andrew67
HOST: 66.14.254.5:4555

While the user is providing his proposed username and password, the present embodiment running locally analyses the capabilities of the user's device and asks the user whether he intends to remain logged into The Co-operative 24 hours a day and asks the user to identify any personal certificates on this machine.

This information is sent to the Login Super Peer with the previous login message. The relevant details are sent in the following format:
POWER: 1
SUPER: N
CERTIFICATES: NIL Where "power: 1" means that this is a strong peer (whereas 2 means normal and 3 means weak), "super: n" means that the user does not intend to have this device connected to The Co-operative 24 hours a day (where "y" would mean that he does), and "certificates:nil" means that this machine has no personal certificates (if there were certificates the relevant details would be included).

Once a username and password have been registered, the user is asked by his version of the present embodiment to enter his email address, geographic location, and homepage and is asked whether he wants each of these stored with the Super Peers. This information is stored locally. If the first two, for example, are to be stored with the Super Peers, then the following message is sent to the Directory Super Peer.
POST/raekanet/storedetails.asp HTTP/1.0
Referer: http://19.254.17.185
Connection: Keep-Alive
User-Agent: Raekanet/1.0
1Host: 119.254.17.185
Accept: */*
Content-type: application/x-www-form-urlencoded
Content-length: 14
USER=TimeLord
PSWD=doctor7
HOST=119.254.17.185
PORT=4555
DATE=Monday, 23-Oct-00 23:33:35 GMT
EMAIL=TimeLord%40yahoo%2Ecom
LOCATION=London+UK
HOMEPAGE=

Note: Since the Directory Super Peer accepts HTTP messages, a standard HTTP POST is used. Even though the message is from the user's regular host IP address and it does not change the user's regular host IP address, a password is required. Because the password is required, the body of the post is encrypted. It is not encrypted in the above example solely for the purpose of explaining the concepts.

Any of the details sent to the Directory Super Peer during initial registration can be changed in the future by posting a similar message. Fields not listed are left unchanged.

Initiation

The redundancy of the various joint and jury peering relationships means that once The Co-operative is initiated, it will most likely continue to operate permanently. Only a catastrophic failure of a significant portion of the network or a significant number of major computers would see The Co-operative go down. Regardless, The Co-operative needs to be launched at some point.

Launching of The Co-operative involves the following steps:

1) The present embodiment is launched on what will become one of the Login Super Peers. A public/private key pair is generated.

2) A local "Who's Online" database is created with the first entry being itself.

3) If the LOGINSUPER flag is set to true, a local "Resource IP" database is created with every entry initially set to itself.

4) The Login Super Peer is then online, "listening" to its port utilised by the present embodiment.

5) The Login Super Peer accepts other peers logging in, adding them to the "Who's Online" database. When a potential Super Peer logs in, the Login Super Peer:

i) enlists them as sibling peers for every single service, until it has four siblings ii) transfers services to these peers, transferring one peer to each of the following until each has one and then repeating the cycle until each has a full set of Super Peers:
   a) one to each demand/database holder pair (9 and 10),
   b) one as Messaging Peer (5)
   c) one as the Directory Peer (6)
   d) one as Chat Room Guide and moderator of every chat room (3 and 11)
   e) one as Notice Board Guide and moderator of every board (4 and 12)
   f) one to each Item Title Guide (8)
   g) one as Category Guide (2)
   h) one to each functioning auction and witnessing (13 and 14)
   i) one as Transaction Creator (7)
   j) a new one as Chat Room Guide (3)
   k) a new one as Notice Board Guide (4)
   l) new ones as database holders but not demand holders (10)

The above process means that initially the first peer (who becomes one of the Login Super Peers) starts as the sole peer offering every single service. The first Super Peers to log on, play a shadowing role in the event that the first peer should go down. Subsequent peers slowly assume responsibility for every service other than being Login Super Peer.

A Second Embodiment

A second embodiment of the present invention operates as a marketplace for the purchasing and bulk purchasing of commercially available products. In this embodiment, demand is culled from three sources:

a) the requests of individuals (including corporate users) arising from their use of software similar to the first embodiment;

b) requests arising from an automated search of web sites running auctions, offering "want ads", or otherwise listing potential demand; and c) aggregated requests arising from combining similar requirements uncovered by either of the first two sources.

In this embodiment, the hierarchy of super peers referred to in the first embodiment as category guides, item title guides, and demand holders is more complex. In particular, the hierarchy involves more levels and super peers at any given level often have overlapping interest in a particular demand. This more complex hierarchy acts as a filtering engine such that the super peers at the lowest level (the demand holders) hold all demand relevant to a particular corporate user.

Having such highly targeted demand holders is important because rather than a demand holder receiving from an unknown peer a request for a dump of the full demand list, the demand holder actively and periodically contacts one or more specific corporate users with the latest summary of demand. Corporate users pay a subscription fee for this service.

In parallel to the above subscriber service, there still exist general demand holders (similar to as found in the first embodiment) from which non-subscriber peers are able to access demand.

In this second embodiment, the software operated by the subscribers often is different than that operated by the demanders and by the other general users of the network. Both of these often are different than the software providing the central services.

The resulting system still retains many "peer-to-peer"-like qualities in that once a demand request is linked to specific supply, the demander and the subscriber have the ability to contact each other directly to negotiate a transaction. In addition the resulting system still supports the less structured interaction of demanding peers and supplying peers.

A Third Embodiment

A third embodiment of the present invention manifests as an exceptionally sophisticated search engine, one employing neural networking principles to yield the most relevant organisational structure for anything (demands for physical products, supply details, graphics, music, poems, questions and answers, anything).

The starting point is the set of tools for establishing the demand database hierarchy—tools based on characteristics and values. The main example in the first embodiment has four characteristics: category, item, version, and condition (e.g. comic book, Iron Man, issue 4, in good condition). The number of characteristics and their values are arbitrary. New branches (i.e. characteristics and values) can be added to the hierarchical tree easily. A given item may appear in multiple places on the tree. Some branches may have more levels than other branches. Individual branches will overlap in their remit. The hierarchical tree then is multi-tiered, overlapping, and above all else organic.

Anyone with an interest in a topic can propose a new structure . . . a new way of organising the material. Indeed, they can link their proposals directly in the existing hierarchy. If the new structure is useful, it is used. If it is not, it isn't. An adaptation of the system for ranking the trustworthiness of individuals is then used to track the objective value of a particular branch (e.g. how many people have actually used it, how many items are attached to underlying branches) and its subject value (e.g. how many people think that it is the best branching to use).

Combined with the chat room and notice boards, this dynamic exchange allows everyone with an interest in a topic to create collectively the structure for thinking about it and the language for talking about it.

A more complex tree need not mean more complex queries. In fact, the exact opposite is true. For any given search, all characteristics are optional. The characteristics for which values are supplied and the values themselves define how the search progresses through the tree. These defines where an individual lodges his item in the hierarchical tree (and it may be in multiple places) and defines how other people are able to find it.

The technology allows both individuals and software agents to work on the tree—add both to its content and to its structure. The timestamping methods can be adapted to ensure that the tree remain vibrant and that the content of disused areas are confirmed periodically and that dead branches are culled.

Although the present invention has been described by way of example only and with reference to the possible embodiments thereof, it is to be appreciated that improvements and/or modifications may be made thereto without departing from the scope of the invention as set out in the appended claims.

Where in the foregoing description reference has been made to integers or components having known equivalents, then such equivalents are herein incorporated as if individually set forth.

What is claimed is:

1. A method of operating a peer-to-peer network with a first peer and a second peer, wherein the first peer is a super-peer, which is adapted to perform a co-operative role, comprising:
   a) the super-peer receiving notification that the co-operative role is requested;
   b) the super-peer establishing contact with the second peer; and
   c) providing co-operation between the first and second peers;
   wherein the co-operative role is a holding role to store data for the benefit of the second peer, where the holding role includes the steps of the super-peer;
   d) receiving data;
   e) recording the received data as stored data;
   f) receiving requests for the stored data from users of the network or a process running on the network;
   g) retrieving the stored data based on the request; and
   h) transmitting the stored data to the requesting user or process;
   wherein the stored data corresponds to links to other peers; and
   wherein the links constitute a neural network having statistical attributes which indicate characteristics of the link.

* * * * *